United States Patent
Ould-Ahmed-Vall et al.

(10) Patent No.: US 11,391,581 B2
(45) Date of Patent: Jul. 19, 2022

(54) TECHNOLOGIES FOR ROUTE NAVIGATION SHARING IN A COMMUNITY CLOUD

(71) Applicant: Intel Corporation, Santa Clara, CA (US)

(72) Inventors: Elmoustapha Ould-Ahmed-Vall, Chandler, AZ (US); Sunil K. Cheruvu, Chandler, AZ (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/188,666

(22) Filed: Nov. 13, 2018

(65) Prior Publication Data

US 2019/0323847 A1    Oct. 24, 2019

Related U.S. Application Data

(63) Continuation of application No. 15/708,338, filed on Sep. 19, 2017, now Pat. No. 10,222,219, which is a
(Continued)

(51) Int. Cl.
*G01C 21/00* (2006.01)
*G01C 21/34* (2006.01)
(Continued)

(52) U.S. Cl.
CPC ..... *G01C 21/3415* (2013.01); *G01C 21/3492* (2013.01); *G01C 21/3691* (2013.01);
(Continued)

(58) Field of Classification Search
CPC ............... G06F 11/079; G06F 11/0709; G06F 11/0712; H04L 41/0893; H04L 41/0681;
(Continued)

(56) References Cited

U.S. PATENT DOCUMENTS 6,252,544 B1 *  6/2001  Hoffberg ............ H04B 7/18576
                                                701/445
2004/0073361 A1    4/2004  Tzamaloukas et al.
(Continued)

FOREIGN PATENT DOCUMENTS

CN          1705954       8/2013
CN        104044593       9/2014

OTHER PUBLICATIONS

Office action in European patent application No. EP15843934.9, dated May 13, 2019 (9 pages).
(Continued)

*Primary Examiner* — Ian Jen
(74) *Attorney, Agent, or Firm* — Hanley, Flight & Zimmerman

(57) ABSTRACT

Technologies for sharing route navigation data in a community cloud include a mobile navigation device of a vehicle and a remote mobile navigation device of a remote vehicle. The mobile navigation device generates sensor data associated with a current route of the vehicle and determines whether a reference traffic event occurs within a segment of the current route of the vehicle. In response to a determination that a reference traffic event occurs, the mobile navigation devices transmits route update data to the remote mobile navigation device. Based on the route update data, the remote mobile navigation device updates a current route of the remote vehicle to avoid the reference traffic event within a corresponding segment of the current route of the remote vehicle. The mobile navigation device may also transmit the sensor data to a community compute device, which may transmit route update data to the remote mobile navigation device.

16 Claims, 6 Drawing Sheets

Related U.S. Application Data continuation of application No. 14/499,154, filed on Sep. 27, 2014, now Pat. No. 9,791,282.

(51) Int. Cl.
*G01C 21/36* (2006.01)
*G08G 1/01* (2006.01)
*G08G 1/0968* (2006.01)

(52) U.S. Cl.
CPC ......... *G08G 1/0112* (2013.01); *G08G 1/0133* (2013.01); *G08G 1/0141* (2013.01); *G08G 1/096827* (2013.01); *G08G 1/096844* (2013.01)

(58) Field of Classification Search
CPC ............. H04L 41/0677; H04L 41/0631; H04L 41/0654; H05K 999/99
See application file for complete search history.

(56) References Cited

U.S. PATENT DOCUMENTS

| | | | |
|---|---|---|---|
| 2009/0024322 A1* | 1/2009 | Tomita | G08G 1/09675 701/431 |
| 2010/0241346 A1 | 9/2010 | Waris | |
| 2011/0035146 A1 | 2/2011 | Guha et al. | |
| 2011/0310733 A1* | 12/2011 | Tzamaloukas | H04W 28/06 370/230 |
| 2013/0218445 A1 | 8/2013 | Basir | |
| 2013/0246923 A1 | 9/2013 | Iwai et al. | |
| 2014/0195146 A1 | 7/2014 | Grigsby et al. | |
| 2014/0229105 A1 | 8/2014 | Lee et al. | |
| 2014/0277835 A1 | 9/2014 | Filev et al. | |
| 2016/0171521 A1* | 6/2016 | Ramirez | G06Q 10/0635 701/409 |
| 2016/0210853 A1* | 7/2016 | Koravadi | G08G 1/096775 |
| 2017/0098373 A1* | 4/2017 | Filley | G08G 1/096708 |
| 2017/0130635 A1* | 5/2017 | Smith | F01N 11/002 |
| 2017/0234691 A1* | 8/2017 | Abramson | G01C 21/3484 701/442 |

OTHER PUBLICATIONS

First Office action in Chinese patent application No. 201580045680.1, dated Mar. 4, 2019 (7 pages).

Chinese Office action in Chinese patent application No. 201580045680.1 dated Nov. 19, 2019, including machine translation (12 pages).

\* cited by examiner

US 11,391,581 B2

TECHNOLOGIES FOR ROUTE NAVIGATION SHARING IN A COMMUNITY CLOUD

CROSS-REFERENCE TO RELATED APPLICATIONS

The present application is a continuation of U.S. patent application Ser. No. 15/708,338, filed Sep. 19, 2017, which is a continuation of U.S. patent application Ser. No. 14/499,154, filed Sep. 27, 2014.

BACKGROUND

Mobile computing devices such as smartphones, tablets, and in-vehicle infotainment devices typically include applications for navigation, driving directions, or pathfinding. Those applications may use the global positioning system (GPS) or other techniques to determine the device location. Driving directions and other routes may be determined by the mobile device or by a server device in communication with the mobile device. Directions are typically generated for the route having the shortest distance or travel time between two points.

Cloud navigation is an increasingly popular service being offered by many cloud computing providers (i.e., "cloud service providers"). Such cloud service providers typically receive location and traffic information from a large number of subscriber devices (e.g., in-vehicle navigation systems, smartphones, etc.) and, based on that information, provide real-time routing to subscribers upon request. However, to take advantage of such navigation services, subscribers must typically agree to the sharing of their personal location information with the cloud service provider and/or other subscribers. As a result, a portion of each subscriber's autonomy and privacy is diminished through the use of such cloud services.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
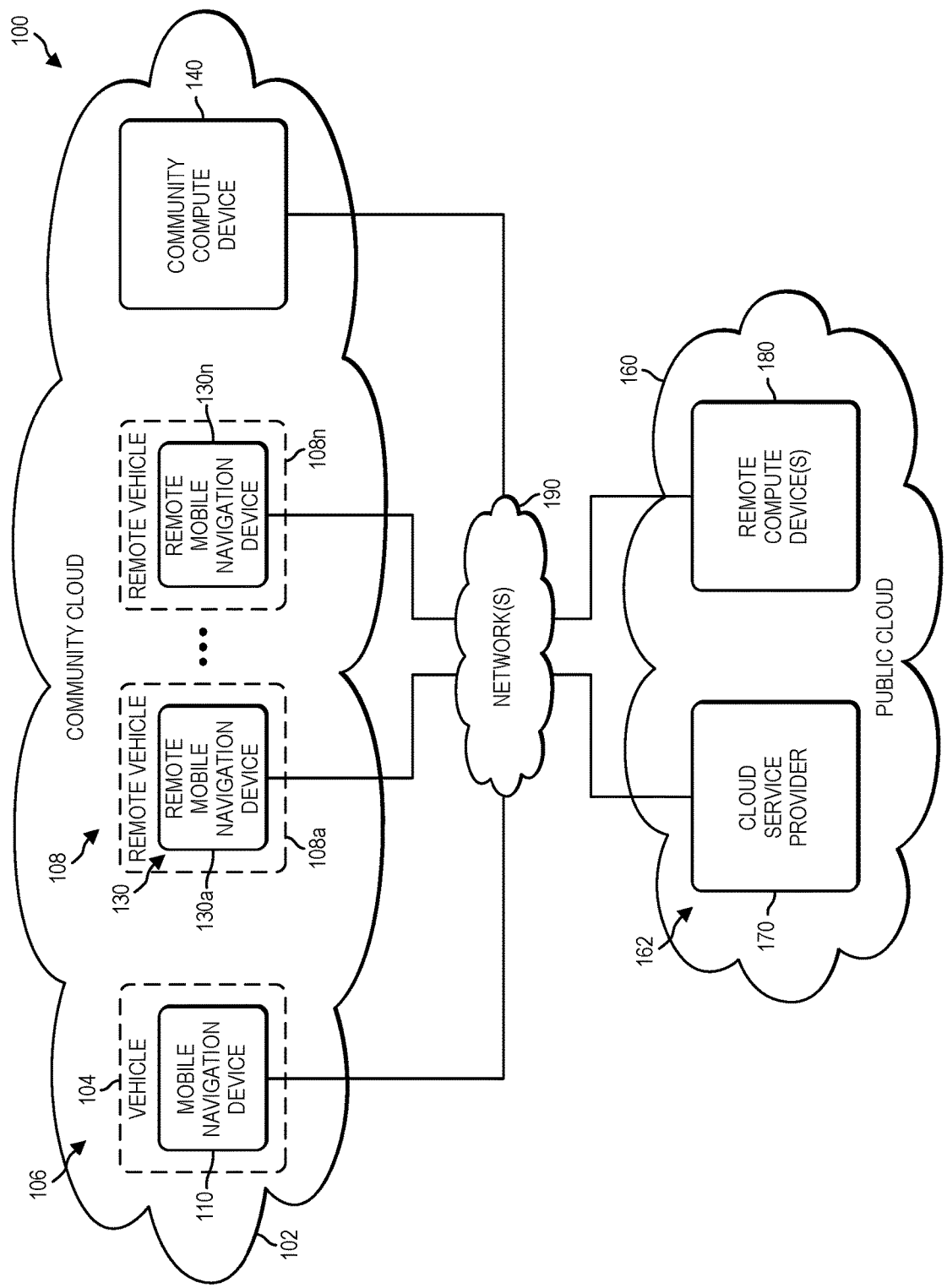
FIG. 1 is a simplified block diagram of at least one embodiment of a system for sharing route navigation data in a community cloud.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 2:
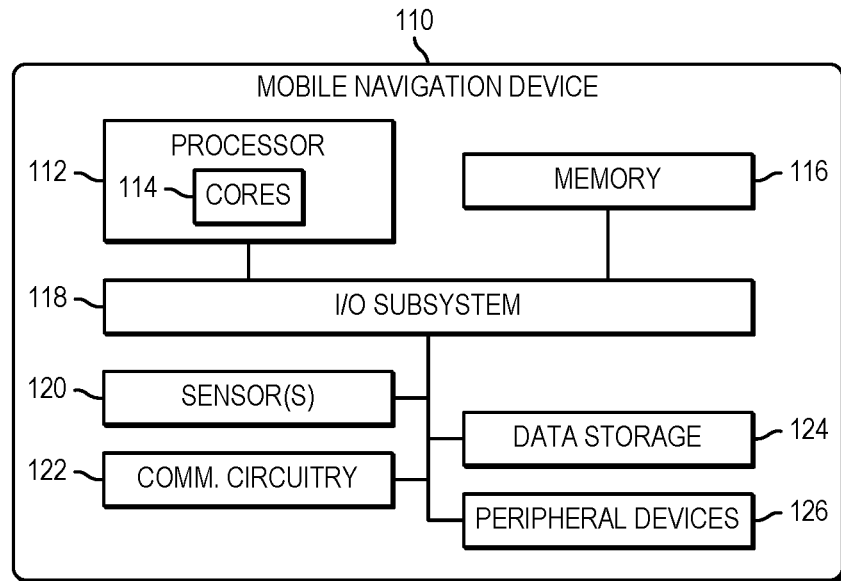
FIG. 2 is a simplified block diagram of at least one embodiment of the mobile navigation device of the system of FIG. 1.
Figure 3:
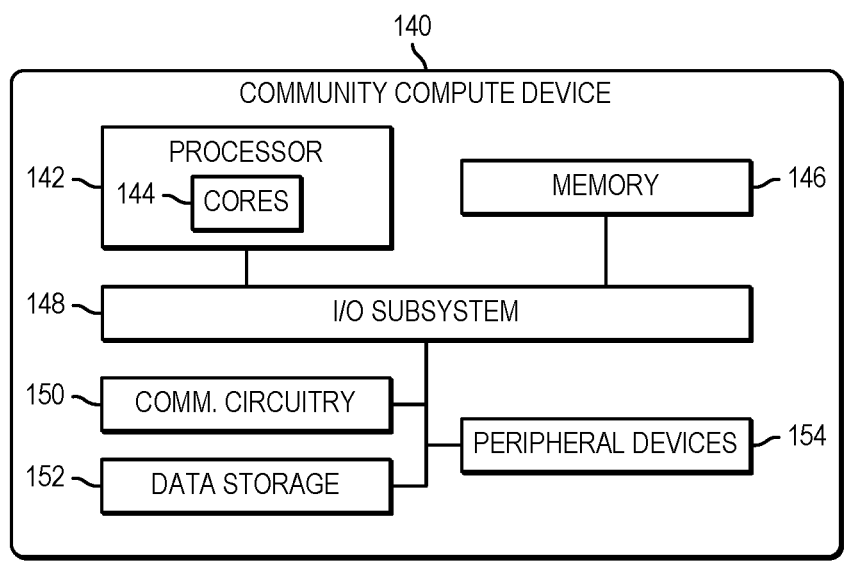
FIG. 3 is a simplified block diagram of at least one embodiment of the community compute device of the system of FIG. 1.

Referring now to FIGS. 1-3, in an illustrative embodiment, a system 100 for route navigation in a community cloud 102 includes a mobile navigation device 110, one or more remote mobile navigation devices 130, and a community compute device 140. Each of the mobile navigation device 110, the remote mobile navigation device(s) 130, and the community compute device 140 may be communicatively coupled to any number of different networks 190. As shown in FIG. 1, the mobile navigation device 110 may be included in or otherwise associated with a vehicle 104 and each of the mobile navigation device(s) 130 may be included in or otherwise associated with one or more remote vehicles 108. In the illustrative embodiment, each of the vehicles 104, 108 is embodied as a wheeled passenger vehicle (e.g., a car, truck, truck-tractor, bus, etc.). However, it should be appreciated that, in other embodiments, one or more of the vehicles 104, 108 may be embodied as another type of vehicle (e.g., as a rail-driven vehicle, aircraft, maritime vessel, unmanned vehicle, drone, or another vehicle suited for application of the described techniques and mechanisms) or other moveable apparatus.

As shown, the mobile navigation device 110, the remote mobile navigation device(s) 130, and the community compute device 140 are each members 106 of or otherwise form the community cloud 102. Each member of the community cloud 102 is configured to directly communicate or share information with other members of the community cloud 102. As such, information may be shared directly among members of the community cloud 102 without requiring the information to be first shared with a public cloud service provider 170 or other members 162 of a public cloud 160 such as, for example, the one or more remote compute devices 180. It should be appreciated that by only sharing information with other members 106 of the community cloud 102, users may still benefit from information obtained from other users without being required to share their own personal information with unknown or untrusted users or cloud service providers. In that way, privacy may be increased for users having devices that are members 106 of the community cloud 102.

In the illustrative embodiment, the mobile navigation device 110, the remote mobile navigation device(s) 130, and the community compute device 140 are configured to share vehicle routing or navigation information with each other. For example, the mobile navigation device 110 is configured to generate sensor data corresponding to a current route of the vehicle 104. At least one segment (e.g., a portion, subset, etc.) of the current route of the vehicle 104 may be similar to or otherwise correspond to one or more segments of a different route (e.g., an existing route, a commonly traveled route, a future route, etc.) of a remote vehicle 108. In operation, the mobile navigation device 110 determines, based on the generated sensor data, whether a reference traffic event (e.g., an amount of traffic congestion, a type of traffic accident, an amount or type of roadway construction, a roadway obstruction, a roadway hazard, etc.) has occurred in the segment of the current route that corresponds to the similar and/or corresponding segment(s) of the route of the remote vehicle 108. In response to making such a determination, the mobile navigation device 110 of the vehicle 104 generates and transmits route update data (e.g., an alternate route, information indicative of an alternate route, etc.) to the remote mobile navigation device 130 of the remote vehicle 108 (e.g., the remote mobile navigation device 130*a* of the remote vehicle 108*a*). In such embodiments, the remote mobile navigation device 130 of the remote vehicle 108 updates the current route of the remote vehicle 108 to avoid the segment(s) in which the reference traffic event is determined to have occurred.

In some embodiments, the mobile navigation device 110 transmits the sensor data corresponding to the current route of the vehicle 104 to the community compute device 140. In such embodiments, the community compute device 140 may be configured to determine, based on the received sensor data, whether a reference traffic event has occurred within a segment of the current route of the vehicle 104. As discussed, the segment of the current route of the vehicle 104 may be similar to or otherwise correspond to one or more segments of a different route (e.g., an existing route, a commonly traveled route, a future route, etc.) of a remote vehicle 108. In response to determining that that a reference traffic event has occurred within a segment of the current route of the vehicle 104, the community compute device 140 generates and transmits route update data to the remote mobile navigation device 130 of the remote vehicle 108 (e.g., the remote mobile navigation device 130*a* of the remote vehicle 108*a*). In such embodiments, the remote mobile navigation device 130 updates the current route of the remote vehicle 108 to avoid the segment(s) in which the reference traffic event is determined to have occurred.

The mobile navigation device 110 may be embodied as, or form a portion of, an in-vehicle infotainment system, a navigation system, and/or other vehicle-based computing system. In other embodiments, the mobile navigation device 110 may instead be embodied as a standalone computing device or computing system. For example, in some embodiments, the mobile navigation device 110 may instead be embodied as a computing device unrelated to the vehicle 104. In such embodiments, mobile navigation device 110 may be embodied as any type of computing device capable of performing the functions described herein (e.g., a server, desktop computer, laptop computer, tablet computer, notebook, netbook, Ultrabook™, cellular phone, smartphone, personal digital assistant, mobile Internet device, wearable computing device, consumer electronic device, Hybrid device, and/or any other computing/communication device). As illustratively shown in FIG. 2, the mobile navigation device 110 includes a processor 112, a memory 116, an input/output (I/O) subsystem 118, one or more sensors 120, communication circuitry 122, a data storage 124, and one or more peripheral devices 126. Of course, the mobile navigation device 110 may include other or additional components, such as those commonly found in a computer (e.g., various input/output devices), in other embodiments. Additionally, in some embodiments, one or more of the illustrative components may be incorporated in, or otherwise form a portion of, another component. For example, the memory 116, or portions thereof, may be incorporated in the processor 112 in some embodiments.

The processor 112 may be embodied as any type of processor capable of performing the functions described herein. For example, in some embodiments, the processor 112 may be embodied as a single core processor, digital signal processor, microcontroller, or other processor or processing/controlling circuit. In other embodiments, such as the one illustratively shown in FIG. 2, the processor 112 may be embodied as a multi-core processor having multiple processor cores 114. In such embodiments, each processor core 114 of the processor 112 is capable of executing one or more applications. Additionally, in some embodiments, the processor 112, or a portion thereof, may be embodied as a remote data processor, virtual processor, computation server, or service. In such embodiments, the mobile navigation device 110 may be configured to offload complex calculations to the remote processor or service for computation depending on various criteria (e.g., complexity of calculation, location, subscription status, etc.). In some embodiments, some calculations may be performed locally, while others are performed remotely. For example, in some embodiments, the mobile navigation device 110 may be embodied as a low-power or low-featured device configured to offload route calculations and determinations to a remote data processing server or service.

The memory 116 may be embodied as any type of volatile or non-volatile memory or data storage capable of performing the functions described herein. In operation, the memory 116 may store various data and software used during operation of the mobile navigation device 110 such as operating systems, applications, programs, libraries, and drivers. The memory 116 is communicatively coupled to the processor 112 via the I/O subsystem 118, which may be embodied as circuitry and/or components to facilitate input/output operations with the processor 112, the memory 116, and other components of the mobile navigation device 110. For example, the I/O subsystem 118 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 118 may form a portion of a system-on-a-chip (SoC) and be incorporated, along with the processor 112, the memory 116, and other components of the mobile navigation device 110, on a single integrated circuit chip.

In the illustrative embodiment, the sensor(s) 120 collect data based on the physical environment and/or context of the mobile navigation device 110. In various embodiments, the sensor(s) 120 may be embodied as, or otherwise include, for example, location sensors, inertial sensors, proximity sensors, optical sensors, light sensors, audio sensors, temperature sensors, motion sensors, piezoelectric sensors, pressure sensors, image sensors, and/or other types of sensors that generate data useful to the mobile navigation device 110, which may vary depending on the particular purpose of the mobile navigation device 110. For example, in the illustrative embodiment, the sensor(s) 120 are configured to generate data indicative of the current location of the vehicle 104 and/or the mobile navigation device 110. Additionally or alternatively, the sensor(s) 120 are configured to generate data indicative of the traffic conditions at the current location of the vehicle 104 and/or the mobile navigation device 110.

The communication circuitry 122 of the mobile navigation device 110 may be embodied as any type of communication circuit, device, or collection thereof, capable of enabling communications between the mobile navigation device 110 and other remote devices (e.g., the remote mobile navigation device(s) 130, the community compute device 140, the cloud service provider 170, the remote compute device(s) 180, and/or other member compute devices 106, 162 of the community cloud 102 and/or the public cloud 160) via one or more communication networks 190 (e.g., local area networks, personal area networks, wide area networks, cellular networks, a global network such as the Internet, etc.). The communication circuitry 122 may be configured to use any one or more communication technology (e.g., wireless or wired communications) and associated protocols (e.g., Ethernet, Bluetooth®, Wi-Fi®, WiMAX, etc.) to effect such communication.

The data storage 124 may be embodied as any type of device or devices configured for short-term or long-term storage of data such as, for example, memory devices and circuits, memory cards, hard disk drives, solid-state drives, or other data storage devices. For example, the data storage 124 may be configured to store an operating system to be initialized and/or executed by the mobile navigation device 110. In some embodiments, portions of the operating system may be copied to the memory 116 during operations for faster processing and/or any other reason.

In some embodiments, the mobile navigation device 110 may also include one or more peripheral devices 126. The peripheral devices 126 may include any number of additional peripheral or interface devices, such as speakers, microphones, additional storage devices, and so forth. The particular devices included in the peripheral devices 126 may depend on, for example, the type and/or intended use of the mobile navigation device 110 (e.g., whether the mobile navigation device 110 is a stand-alone system or incorporated into a larger in-vehicle infotainment system).

The remote mobile navigation device(s) 130 (e.g., the remote mobile navigation device 130a and the remote mobile navigation device 130n) may be embodied as, or form a portion of, an in-vehicle infotainment system, a navigation system, and/or other vehicle-based computing system associated with, or otherwise related to, one or more of the remote vehicles 108. In other embodiments, the remote mobile navigation device(s) 130 may instead be embodied as standalone computing devices or computing systems. For example, in some embodiments, the remote mobile navigation device(s) 130 may instead be embodied as computing devices unrelated to the remote vehicle(s) 108. In such embodiments, each of the remote mobile navigation devices 130 may be embodied as any type of computing device capable of performing the functions described herein (e.g., a server, desktop computer, laptop computer, tablet computer, notebook, netbook, Ultrabook™, cellular phone, smartphone, personal digital assistant, mobile Internet device, wearable computing device, consumer electronic device, Hybrid device, and/or any other computing/communication device). As such, the remote mobile navigation device(s) 130 may include devices and structures commonly found in computing devices such as processors, memory devices, communication circuitry, and data storages, which are not shown in FIGS. 1-3 for clarity of the description. For example, in the illustrative embodiment, the remote mobile navigation device(s) 130 may include devices and structures similar to the processor 112, memory 116, input/output (I/O) subsystem 118, sensor(s) 120, communication circuitry 122, data storage 124, and peripheral device(s) 126 of the mobile navigation device 110 discussed above. In such embodiments, the devices and structures of the remote mobile navigation device(s) 130 may be configured to provide functionality similar to the functionality provided by the corresponding devices and structures of the mobile navigation device 110. Of course, the remote mobile navigation device(s) 130 may include other or additional components, such as those commonly found in a computer (e.g., various input/output devices), in other embodiments.

The community compute device 140 may be embodied as, or otherwise include, any type of computing device capable of performing the functions described herein including, but not limited to a server, desktop computer, laptop computer, tablet computer, notebook, netbook, Ultrabook™, cellular phone, smartphone, personal digital assistant, mobile Internet device, wearable computing device, consumer electronic device, smart television, smart appliance, Hybrid device, and/or any other computing/communication device. As illustratively shown in FIG. 3, the community compute device 140 includes a processor 142, a memory 146, an input/output (I/O) subsystem 148, communication circuitry 150, a data storage 152, and one or more peripheral devices 154. Of course, the community compute device 140 may include other or additional components, such as those commonly found in a computer (e.g., various input/output devices), in other embodiments. Additionally, in some embodiments, one or more of the illustrative components may be incorporated in, or otherwise form a portion of, another component. For example, the memory 146, or portions thereof, may be incorporated in the processor 142 in some embodiments.

The processor 142 may be embodied as any type of processor capable of performing the functions described herein. For example, in some embodiments, the processor 142 may be embodied as a single core processor, digital signal processor, microcontroller, or other processor or processing/controlling circuit. In other embodiments, such as the one illustratively shown in FIG. 3, the processor 142 may be embodied as a multi-core processor having multiple processor cores 144. In such embodiments, each processor core 144 of the processor 142 is capable of executing one or more applications.

The memory 146 may be embodied as any type of volatile or non-volatile memory or data storage capable of performing the functions described herein. In operation, the memory 146 may store various data and software used during operation of the community compute device 140 such as operating systems, applications, programs, libraries, and drivers. The memory 146 is communicatively coupled to the processor 142 via the I/O subsystem 148, which may be embodied as circuitry and/or components to facilitate input/output operations with the processor 142, the memory 146, and other components of the community compute device 140. For example, the I/O subsystem 148 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 148 may form a portion of a system-on-a-chip (SoC) and be incorporated, along with the processor 142, the memory 146, and other components of the community compute device 140, on a single integrated circuit chip.

The communication circuitry 150 of the community compute device 140 may be embodied as any type of communication circuit, device, or collection thereof, capable of enabling communications between the community compute device 140 and other remote devices (e.g., the mobile navigation device 110, the remote mobile navigation device(s) 130, the cloud service provider 170, the remote compute device(s) 180, and/or other member compute devices 106, 162 of the community cloud 102 and/or the public cloud 160) via the one or more communication networks 190 (e.g., local area networks, personal area networks, wide area networks, cellular networks, a global network such as the Internet, etc.). The communication circuitry 150 may be configured to use any one or more communication technology (e.g., wireless or wired communications) and associated protocols (e.g., Ethernet, Bluetooth®, Wi-Fi®, WiMAX, etc.) to effect such communication.

The data storage 152 may be embodied as any type of device or devices configured for short-term or long-term storage of data such as, for example, memory devices and circuits, memory cards, hard disk drives, solid-state drives, or other data storage devices. For example, the data storage 152 may be configured to store an operating system to be initialized and/or executed by the community compute device 140. In some embodiments, portions of the operating system may be copied to the memory 146 during operations for faster processing and/or any other reason.

In some embodiments, the community compute device 140 may also include one or more peripheral devices 154. The peripheral devices 154 may include any number of additional peripheral or interface devices, such as speakers, microphones, additional storage devices, and so forth. The particular devices included in the peripheral devices 154 may depend on, for example, the type and/or intended use of the community compute device 140.

The cloud service provider 170 may be embodied as, or otherwise include, any type of computing device (e.g., a server, desktop computer, and/or any other computing/communication device) capable of providing electronic services (e.g., route navigation, social networking, online chatting, e-mail services, online transactions, online purchases, electronic billing statements, electronic bill payment, account balances, etc.) over the network(s) 190 to a user and/or a compute device of the user. As such, the cloud service provider 170 may include devices and structures commonly found in computing devices such as processors, memory devices, communication circuitry, and data storages, which are not shown in FIGS. 1-3 for clarity of the description. In the illustrative embodiment, the cloud service provider 170 may be a member compute device 162 of the public cloud 160 configured to provide navigation services to the remote compute device(s) 180 and/or other member compute devices 162 of the public cloud 160. Additionally or alternatively, as discussed below, the cloud service provider 170 may be configured to provide navigation services to one or more member compute devices 106 of the community cloud 102. In either case, the cloud service provider 170 may be configured transmit and/or receive route or navigation data to/from one or more remote compute devices (e.g., the remote compute device(s) 180, the mobile navigation device 110, the remote mobile navigation device(s) 130, the community compute device 140, and/or one or more member compute devices 106, 162 of the community and public clouds 102, 160). For example, in some embodiments, the cloud service provider 170 is configured to receive traffic and/or location data from a remote compute device 180, generate a navigation route based on the received traffic and/or location data, and transmit the generated navigation route to the remote compute device 180 in response.

The remote compute device(s) 180 may be embodied as, or otherwise include, any type of computing device capable of performing the functions described herein including, but not limited to a server, desktop computer, laptop computer, tablet computer, notebook, netbook, Ultrabook™, cellular phone, smartphone, personal digital assistant, mobile Internet device, wearable computing device, consumer electronic device, smart television, smart appliance, Hybrid device, and/or any other computing/communication device. As such, the remote compute device(s) 180 may include devices and structures commonly found in computing devices such as processors, memory devices, communication circuitry, and data storages, which are not shown in FIGS. 1-3 for clarity of the description. In some embodiments, the remote compute device(s) 180 may be member compute devices 162 of the public cloud 160. In such embodiments, the remote compute device(s) 180 may be configured to transmit and/or receive route navigation data to/from the cloud service provider 170.

Figure 4:
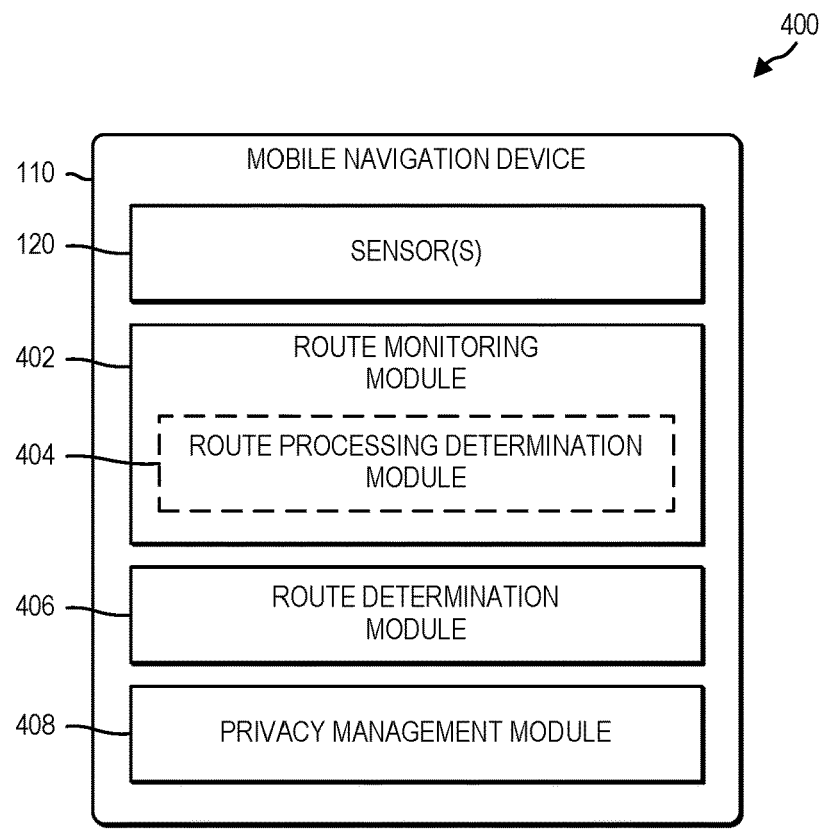
FIG. 4 is a simplified block diagram of at least one embodiment of an environment of the mobile navigation device of the system of FIG. 1.

Referring now to FIG. 4, in use, the mobile navigation device 110 establishes an environment 400 during operation. The illustrative environment 400 includes a route monitoring module 402, a route determination module 406, and a privacy management module 408. In some embodiments, the route monitoring module 402 includes a route processing determination module 404. Each of the modules, logic, and other components of the environment 400 may be embodied as hardware, software, firmware, or a combination thereof. For example, each of the modules, logic and other components of the environment 400 may form a portion of, or otherwise be established by, the processor 112 or other hardware components of the mobile navigation device 110. It should be appreciated that the mobile navigation device 110 may include other components, sub-components, modules, and devices commonly found in a computing device, which are not illustrated in FIG. 4 for clarity of the description. As discussed above, the remote mobile navigation device(s) 130 of the remote vehicles 108 may include devices and structures similar to the devices and structures of the mobile navigation device 110. As such, in use, the remote mobile navigation device(s) 130 may also establish the environment 400 during operation. However, the following discussion of that illustrative environment 400 is described with specific reference to the mobile navigation device 110 for clarity of the description.

The route monitoring module 402 is configured to determine whether a reference traffic event occurs within a segment (e.g., a portion, subset, etc.) of a current route of the vehicle 104 based on sensor data generated by the sensor(s) 120. In some embodiments, the sensor data may include location data (e.g., latitude, longitude, elevation, city, state, country, address, etc.) indicative of a current location of the vehicle 104 and/or the mobile navigation device 110. Additionally or alternatively, the sensor data may include traffic data indicative of a current traffic condition (e.g., a current traffic flow, current weather conditions, a roadway obstruction, a roadway hazard, a traffic accident, etc.) sensed, measured, and/or identified at the current location of the vehicle 104 and/or the mobile navigation device 110. The reference traffic event may be embodied as any one or a combination of a reference amount of traffic congestion (e.g., a threshold volume of traffic, etc.), a reference type of traffic accident (e.g., a fender bender, an accident blocking one or more lanes of traffic, etc.), a reference amount of roadway construction (e.g., a threshold distance of roadway under construction, a threshold number of lanes reduced in a construction zone, etc.), a reference roadway obstruction (e.g., a predefined type of roadway obstruction, a threshold number of lanes reduced because of a roadway obstruction, etc.), or a reference roadway hazard (e.g., a predefined roadway condition such as icy or wet pavement, etc.).

The route monitoring module 402 is also configured to determine whether to generate an alternate route to avoid a reference traffic event occurring in a segment of a current route of the vehicle 104 based on sensor data received from a remote compute device (e.g., the remote mobile navigation device(s) 130, the community compute device 140, and/or any other member compute device 106 of the community cloud 102). For example, in some embodiments, sensor data may be received from a remote mobile navigation device 130 (e.g., the remote mobile navigation device 130a) indicative of a reference traffic event occurring in a segment of a current route of the remote vehicle 108. In such embodiments, the mobile navigation device 110 may determine whether to generate an alternate route to avoid the occurrence of the reference traffic event in one or more segments of the current route of the vehicle 104 that correspond to, or are otherwise similar to, the segment of the current route of the remote vehicle 108.

Additionally, in some embodiments, the route monitoring module 402 may be configured to determine whether the generation of an alternate route to avoid a reference traffic event occurring in a segment of a current route of the vehicle 104 should be performed by the mobile navigation device 110 or another member compute device 106 of the community cloud 102 (e.g., the community compute device 140). To do so, the route monitoring module 402 may include the route processing determination module 404. The route processing determination module 404 may be configured to make such determinations based on, or otherwise as a function of, the amount of processing power required to generate the alternate route from the sensor data received from the remote compute device (e.g., the remote mobile navigation device(s) 130, the community compute device 140, and/or any other member compute device 106 of the community cloud 102). Additionally or alternatively, the route processing determination module 404 may be configured to make such determinations based on, or otherwise as a function of, an amount of remaining battery charge associated with the mobile navigation device 110. Of course, the route processing determination module 404 may be configured to use any other criteria or condition to determine whether the alternate route should be generated by the mobile navigation device 110 or another member compute device 106 of the community cloud 102. Additionally, in some embodiments, the route processing determination module 404 may be configured to offload the route processing determination, or a portion thereof, to a remote data processing server or service as discussed above.

The route determination module 406 is configured to transmit route navigation data to one or more member compute devices 106 of the community cloud 102. For example, in some embodiments, the route determination module 406 is configured to transmit route update data to a remote mobile navigation device 130 (e.g., the remote mobile navigation device 130a) in response to determining or otherwise identifying the occurrence of a reference traffic event in a segment of the current route of the vehicle 104. Upon receipt, the route update data may be used by the remote mobile navigation device 130 to update one or more segments of a current navigation route (e.g., an existing route, a commonly traveled route, a future route, etc.) associated with the remote vehicle 108 that correspond to the segment of the current route of the vehicle 104 within which the reference traffic event is determined to be occurring. In some embodiments, the route update data includes the sensor data generated by the sensor(s) 120 of the mobile navigation device 110.

In some embodiments, the route determination module 406 is configured to generate an alternate route of the remote vehicle 108 in response to determining the occurrence of a reference traffic event in a segment of the current route of the vehicle 104. The alternate route may be generated based on the sensor data generated by the sensor(s) 120. In such embodiments, the route update data transmitted to the remote mobile navigation device 130 may include the alternate route generated by the route determination module 406. As such, the remote mobile navigation device 130 may use the alternate route generated by the route determination module 406 to update a current route (e.g., an existing route, a commonly traveled route, a future route, etc.) of the remote vehicle 108 to avoid the reference traffic event.

Additionally or alternatively, the route determination module 406 may also be configured to determine and/or select an alternate route out of a plurality of previously generated alternate routes that may be used by the remote mobile navigation device 130 of the remote vehicle 108 to avoid the occurrence of the reference traffic event. To do so, the route determination module 406 may determine and/or select the particular alternate route best suited to avoid the location or route segments within which the reference traffic event is occurring. Of course, it should be appreciated that the route determination module 406 may use any process or metric for determining and/or selecting the particular alternate route best suited to avoid the location or route segments within which the reference traffic event is occurring. To facilitate notifying the remote mobile navigation device 130 of the particular alternate route selected, each of the plurality of previously generated alternate routes may be associated with a different route identifier. As such, in response to determining and/or selecting the particular alternate route best suited to avoid the location or route segments within which the reference traffic event is occurring, the route determination module 406 is configured to determine the route identifier associated therewith. In embodiments in which the route determination module 406 determines and/or selects the particular alternate route best suited to avoid the location or route segments within which the reference traffic event is occurring, the route update data transmitted to the remote mobile navigation device 130 may include the corresponding route identifier. In some embodiments, each of the plurality of previously generated alternate routes and the corresponding unique route identifiers may be generated and received from the remote mobile navigation device 130.

In some embodiments, the route determination module 406 may also be configured to generate an alternate route for the vehicle 104 to avoid and/or reroute around the segment of the current route of the vehicle 104 in which the reference traffic event is determined to have occurred. In such embodiments, the route determination module 406 may generate the alternate route for the vehicle 104 based on the sensor data generated by the sensor(s) 120. As such, it should be appreciated that in addition to generating route update data to transmit to the remote mobile navigation device 130 for avoidance of the reference traffic event, the route determination module 406 may also generate an alternate route for the vehicle 104 for avoidance of, or rerouting around, the reference traffic event.

In some embodiments, the route determination module 406 may also be configured to receive a request from the remote mobile navigation device 130 for route data associated with a future route (e.g., an upcoming route, etc.) of the remote vehicle 108. The requested route data may be embodied as historical sensor data generated by the sensor(s) 120 during a previous navigation route of the vehicle 104. In such embodiments, the route determination module 406 may transmit the requested route data to the remote mobile navigation device 130. Additionally or alternatively, the route determination module 406 may also be configured to transmit the sensor data generated by the sensor(s) 120 to the community compute device 140 and/or another member compute device 106 of the community cloud 102 for analysis and processing (e.g., reference traffic event occurrence determination, alternate route determination, alternate route generation, etc.).

The route determination module 406 is also configured to update the current route of the vehicle 104 based on route update data received from a member compute device 106 of the community cloud 102. For example, in some embodiments, the route determination module 406 is configured to receive route update data from a remote mobile navigation device 130 (e.g., the remote mobile navigation device 130a) and/or the community compute device 140. In such embodiments, the received route update data may include sensor data generated by one or more sensors of the remote mobile navigation device 130, an alternate route generated by the remote mobile navigation device 130 and/or the community compute device 140, and/or a route identifier associated with a previously generated alternate route selected by the remote mobile navigation device 130 and/or the community compute device 140. In some embodiments, the route determination module 406 may use the received route update data to avoid a reference traffic event occurrence within a segment of the current route of the vehicle 104. In embodiments in which the route update data includes a route identifier associated with a previously generated alternate route selected by the remote mobile navigation device 130 and/or the community compute device 140, the route determination module 406 may be configured to transmit the plurality of previously generated alternate routes and the corresponding identifiers to the remote mobile navigation device 130 and/or the community compute device 140. Additionally, in some embodiments, the route determination module 406 may receive the route update data from the remote mobile navigation device 130 and/or the community compute device 140 in response to the remote mobile navigation device 130 and/or the community compute device 140 determining, based on data received from the remote mobile navigation device 130, that the reference traffic event is occurring in one or more segments of the current route of the vehicle 104. Additionally or alternatively, the route determination module 406 may receive the route update data from the remote mobile navigation device 130 and/or the community compute device 140 in response to a request transmitted to the remote mobile navigation device 130 and/or the community compute device 140.

In some embodiments, the route determination module 406 may also be configured to transmit a request to a remote mobile navigation device 130 (e.g., the remote mobile navigation device 130a) and/or the community compute device 140 for route data associated with a future route (e.g., an upcoming route, etc.) of the vehicle 104. The requested route data may be embodied as historical sensor data generated by the one or more sensors of the remote mobile navigation device 130 during a previous navigation route of the remote vehicle 108. Additionally or alternatively, in some embodiments, the route determination module 406 may also be configured to transmit a request to the cloud service provider 170 of the public cloud 160 for route data associated with a future route (e.g., an upcoming route, etc.) of the vehicle 104. In such embodiments, the requested route data may be embodied as historical sensor data generated by the one or more sensors of the remote compute devices 180 and/or other member compute devices 162 of the public cloud 160 during previous navigation routes of other remote vehicles. It should be appreciated, however, that transmitting and/or receiving route data (e.g., sensor data, route update data, etc.) to/from member compute devices 162 of the public cloud 160 requires a user of the mobile navigation device 110 to sacrifice a portion of their privacy.

Additionally or alternatively, the route determination module 406 may also be configured to update the current route of the vehicle 104. As discussed, in some embodiments, the route determination module 406 is configured to generate an alternate route for the vehicle 104 based on the sensor data generated by the sensor(s) 120. In such embodiments, the route determination module 406 may be configured to update the current route of the vehicle 104 based on the locally-generated alternate route.

The privacy management module 408 is configured to control communications and/or interactions between the mobile navigation device 110 and one or more remote compute devices (e.g., the remote mobile navigation device(s) 130, the community compute device 140, the cloud service provider 170, the remote compute device(s) 180, and/or any other member compute devices 106, 162 of the community and public clouds 102, 160). For example, in some embodiments, the privacy management module 408 is configured to prevent the transmission and/or reception of route update data to/from member compute devices 162 of the public cloud 160. In that way, the privacy of the member compute devices 106 of the community cloud 102 may be maintained.

Figure 5:
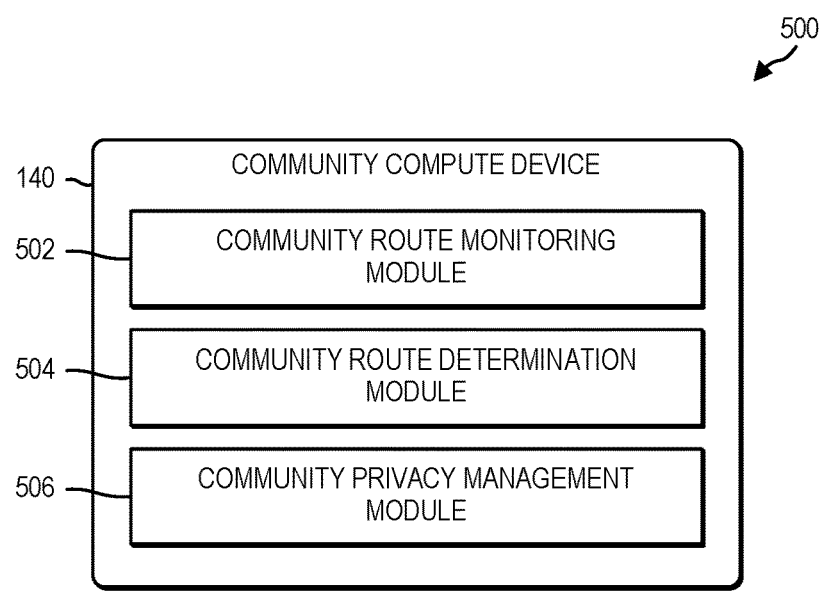
FIG. 5 is a simplified block diagram of at least one embodiment of an environment of the community compute device of the system of FIG. 1.

Referring now to FIG. 5, in use, the community compute device 140 establishes an environment 500 during operation. The illustrative environment 500 includes a community route monitoring module 502, a community route determination module 504, and a community privacy management module 506. Each of the modules, logic, and other components of the environment 500 may be embodied as hardware, software, firmware, or a combination thereof. For example, each of the modules, logic and other components of the environment 500 may form a portion of, or otherwise be established by, the processor 142 or other hardware components of the community compute device 140. It should be appreciated that the community compute device 140 may include other components, sub-components, modules, and devices commonly found in a computing device, which are not illustrated in FIG. 5 for clarity of the description.

The community route monitoring module 502 is configured to receive sensor data from member compute devices 106 of the community cloud 102. For example, in some embodiments, the community route monitoring module 502 is configured to receive sensor data from the mobile navigation device 110 of the vehicle 104. The sensor data may be generated by the sensor(s) 120 of the mobile navigation device 110 during a current route of the vehicle 104. In some embodiments, the sensor data may include location data (e.g., latitude, longitude, elevation, city, state, country, address, etc.) indicative of a current location of the vehicle 104 and/or the mobile navigation device 110. Additionally or alternatively, the sensor data may include traffic data indicative of a current traffic condition (e.g., a current traffic flow, current weather conditions, a roadway obstruction, a roadway hazard, a traffic accident, etc.) sensed, measured, and/or identified at the current location of the vehicle 104 and/or the mobile navigation device 110. It should be appreciated, however, that the sensor data may be received from any one or more of the remote mobile navigation devices 130 instead.

Additionally, the community route monitoring module 502 is configured to determine whether a reference traffic event occurs within a segment (e.g., a portion, subset, etc.) of a current route of a vehicle (e.g., the vehicle 104 or one of the remote vehicles 108) based on the received sensor data. For example, in some embodiments, the community route monitoring module 502 is configured to determine whether a reference traffic event occurs within a segment of the current route of the vehicle 104 based on sensor data received from the mobile navigation device 110. The reference traffic event may be embodied as any one or a combination of a reference amount of traffic congestion (e.g., a threshold volume of traffic, etc.), a reference type of traffic accident (e.g., a fender bender, an accident blocking one or more lanes of traffic, etc.), a reference amount of roadway construction (e.g., a threshold distance of roadway under construction, a threshold number of lanes reduced in a construction zone, etc.), a reference roadway obstruction (e.g., a predefined type of roadway obstruction, a threshold number of lanes reduced because of a roadway obstruction, etc.), or a reference roadway hazard (e.g., a predefined roadway condition such as icy or wet pavement, etc.).

The community route determination module 504 is configured to transmit route navigation data to one or more member compute devices 106 of the community cloud 102. For example, in some embodiments, the community route determination module 504 is configured to transmit route update data to the mobile navigation device 110 of the vehicle 104 in response to determining or otherwise identifying the occurrence of a reference traffic event in a segment of the current route of the remote vehicle 108. Upon receipt, the route update data may be used by the mobile navigation device 110 to update one or more segments of a current navigation route (e.g., an existing route, a commonly traveled route, a future route, etc.) associated with the vehicle 104 that correspond to the segment of the current route of the remote vehicle 108 within which the reference traffic event is determined to be occurring. In some embodiments, the route update data includes the sensor data generated by the sensor(s) of the remote mobile navigation device 130.

In some embodiments, the community route determination module 504 is configured to generate an alternate route in response to determining the occurrence of a reference traffic event in a segment of the current route of the remote vehicle 108. The alternate route may be generated based on the sensor data generated by the sensor(s) of the remote mobile navigation device 130. In such embodiments, the route update data transmitted to the mobile navigation device 110 may include the alternate route generated by the community route determination module 504. As such, the mobile navigation device 110 may use the alternate route generated by the community route determination module 504 to update a current route (e.g., an existing route, a commonly traveled route, a future route, etc.) of the vehicle 104 to avoid the reference traffic event.

Additionally or alternatively, the community route determination module 504 may also be configured to determine and/or select an alternate route out of a plurality of previously generated alternate routes that may be used by the mobile navigation device 110 of the vehicle 104 to avoid the occurrence of the reference traffic event. To do so, the community route determination module 504 may determine and/or select the particular alternate route best suited to avoid the location or route segments within which the reference traffic event is occurring. Of course, it should be appreciated that the community route determination module 504 may use any process or metric for determining and/or selecting the particular alternate route best suited to avoid the location or route segments within which the reference traffic event is occurring. To facilitate notifying the mobile navigation device 110 of the particular alternate route selected, each of the plurality of previously generated alternate routes may be associated with a different route identifier. As such, in response to determining and/or selecting the particular alternate route best suited to avoid the location or route segments within which the reference traffic event is occurring, the community route determination module 504 is configured to determine the route identifier associated therewith. In embodiments in which the community route determination module 504 determines and/or selects the particular alternate route best suited to avoid the location or route segments within which the reference traffic event is occurring, the route update data transmitted to the mobile navigation device 110 may include the corresponding route identifier. In some embodiments, each of the plurality of previously generated alternate routes and the corresponding unique route identifiers may be generated and received from the mobile navigation device 110.

In some embodiments, the community route determination module 504 may also be configured to receive a request from the mobile navigation device 110 and/or one of the remote mobile navigation device(s) 130 for route data associated with a future route (e.g., an upcoming route, etc.) of the vehicle 104 or one of the remote vehicle(s) 108. The requested route data may be embodied as historical sensor data generated by the sensor(s) of the mobile navigation device 110 and/or the remote mobile navigation device(s) 130 during previous navigation routes of the vehicle(s) 104, 108. In such embodiments, the community route determination module 504 may transmit the route data to the mobile navigation device 110 and/or the remote mobile navigation device 130 that requested the data. Additionally or alternatively, the community route determination module 504 may also be configured to transmit the sensor data generated by the sensor(s) of the mobile navigation device 110 and/or the remote mobile navigation device(s) 130 to one or more of the member compute devices 106 of the community cloud 102 for analysis and processing (e.g., reference traffic event occurrence determination, alternate route determination, alternate route generation, etc.).

The community privacy management module 506 is configured to control communications and/or interactions between the community compute device 140 and one or more remote compute devices (e.g., the mobile navigation device 110, the remote mobile navigation device(s) 130, the cloud service provider 170, the remote compute device(s) 180, and/or any other member compute devices 106, 162 of the community and public clouds 102, 160). For example, in some embodiments, the community privacy management module 506 is configured to prevent the transmission and/or reception of route update data to/from member compute devices 162 of the public cloud 160. In that way, the privacy of the member compute devices 106 of the community cloud 102 may be maintained.

Figure 6:
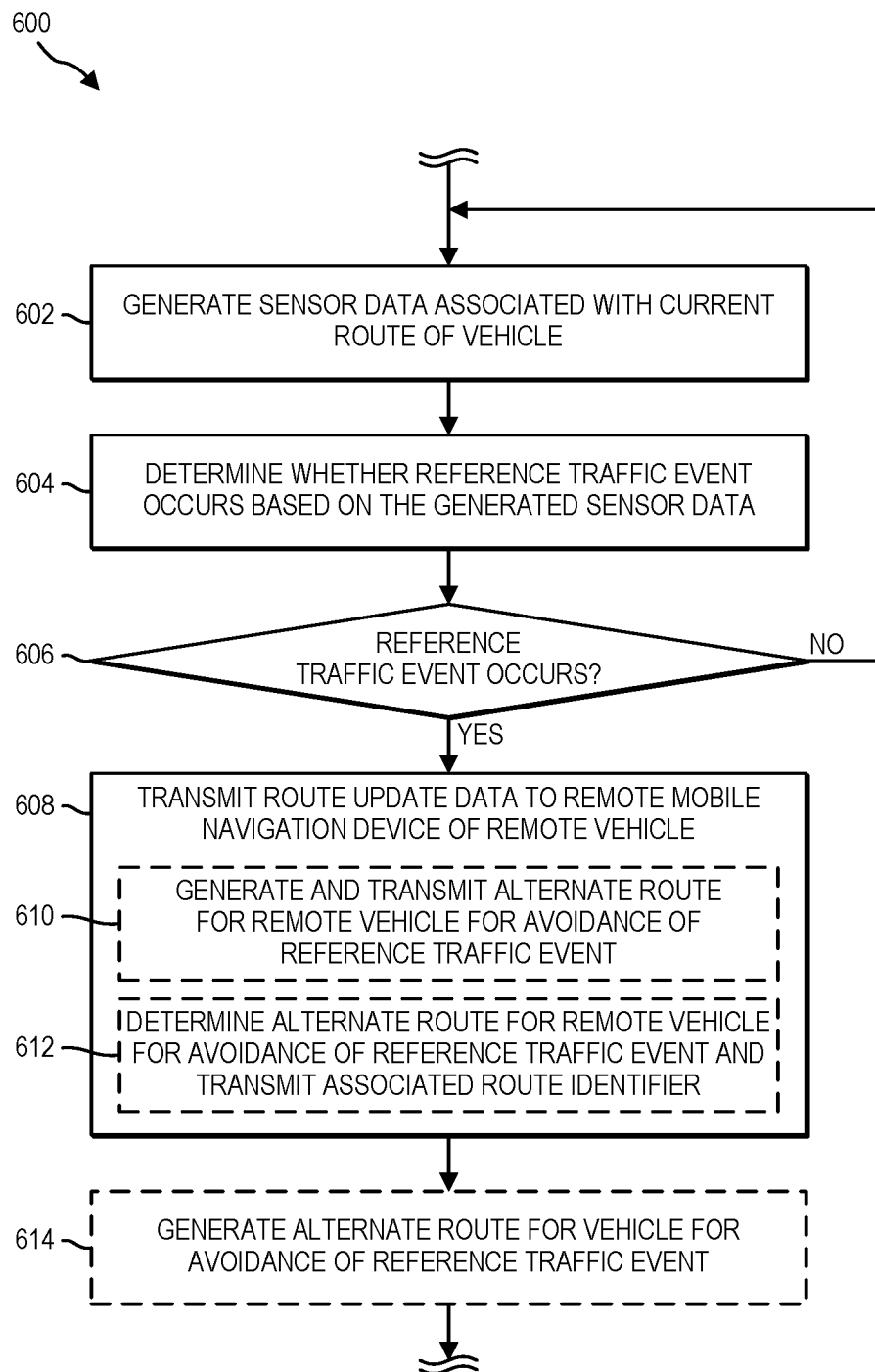
FIG. 6 is a simplified flow diagram of at least one embodiment of a method for sharing route navigation data that may be executed by the mobile navigation device of the system of FIG. 1.

Referring now to FIG. 6, the mobile navigation device 110 may execute a method 600 for sharing route navigation data in the community cloud 102. The method 600 begins with block 602 in which the sensor(s) 120 of the mobile navigation device 110 generate sensor data associated with a current route of the vehicle 104. In some embodiments, the sensor data generated by the sensor(s) 120 of the mobile navigation device 110 includes location data indicative of a current location of the vehicle 104 and/or the mobile navigation device 110. For example, in some embodiments, the sensor(s) 120 of the mobile navigation device 110 generate location data indicative of, but not limited to, the latitude, longitude, elevation, city, state, country, and/or address at which the vehicle 104 and/or the mobile navigation device 110 is currently located. Additionally or alternatively, the sensor data generated by the sensor(s) 120 of the mobile navigation device 110 includes traffic data indicative of a current traffic condition sensed, measured, and/or identified at the current location of the vehicle 104 and/or the mobile navigation device 110. For example, such traffic data may be indicative of the current traffic flow measured at the current location of the vehicle 104, the current weather conditions identified at the current location of the vehicle 104, a roadway obstruction identified at the current location of the vehicle 104, or a roadway hazard identified at the current location of the vehicle 104. In another example, the traffic data may be indicative of a traffic accident identified at the current location of the vehicle 104 via an analysis of one or more images captured at the current location of the vehicle 104. Of course, any other type of traffic data may be sensed, measured, and/or identified by the sensor(s) 120 of the mobile navigation device 110 in other embodiments.

In block 604, the mobile navigation device 110 determines whether a reference traffic event occurs within a segment (e.g., a portion, subset, etc.) of the current route of the vehicle 104 based on the sensor data generated by the sensor(s) 120. The reference traffic event may be embodied as any one or a combination of a reference amount of traffic congestion (e.g., a threshold volume of traffic, etc.), a reference type of traffic accident (e.g., a fender bender, an accident blocking one or more lanes of traffic, etc.), a reference amount of roadway construction (e.g., a threshold distance of roadway under construction, a threshold number of lanes reduced in a construction zone, etc.), a reference roadway obstruction (e.g., a predefined type of roadway obstruction, a threshold number of lanes reduced because of a roadway obstruction, etc.), or a reference roadway hazard (e.g., a predefined roadway condition such as icy or wet pavement, etc.). The method 600 then advances to decision block 606. If, in decision block 606, the mobile navigation device 110 determines that a reference traffic event occurs within a segment of the current route of the vehicle 104, the method 600 advances to block 608. If, however, the mobile navigation device 110 instead determines in decision block 606 that a reference traffic event does not occur within a segment of the current route of the vehicle 104, the method 600 loops back to block 602 and the sensor(s) 120 of the mobile navigation device 110 continue generating sensor data.

In some embodiments, the segment of the current route of the vehicle 104 in which the mobile navigation device 110 determines that the reference traffic event occurs corresponds to, or is otherwise similar to, one or more segments of a navigation route (e.g., an existing route, a commonly traveled route, a future route, etc.) associated with the remote vehicle 108. As such, in block 608, the mobile navigation device 110 transmits route update data to the remote mobile navigation device 130 of the remote vehicle 108 in response to determining that a reference traffic event occurs within the segment of the current route of the vehicle 104. The route update data may be used by the remote mobile navigation device 130 to update corresponding or similar segments of navigation route (e.g., the existing route, commonly traveled route, future route, etc.) of the remote vehicle 108 to avoid the occurrence of the reference traffic event. In some embodiments, the route update data includes the sensor data generated by the sensor(s) 120 of the mobile navigation device 110. In such embodiments, the route update data may be analyzed by the remote mobile navigation device 130 to facilitate avoidance of the reference traffic event occurrence by the remote vehicle 108.

Additionally or alternatively, in some embodiments, the route update data transmitted by the mobile navigation device 110 includes an alternate route for use by the remote mobile navigation device 130 to avoid the corresponding or similar segments of the navigation route of the remote vehicle 108 in which the reference traffic event is determined to have occurred. In such embodiments, in block 610, the mobile navigation device 110 generates the alternate route for the remote vehicle 108 based on the sensor data generated by the sensor(s) 120 and the determined occurrence of the reference traffic event. In other embodiments, the route update data transmitted by the mobile navigation device 110 may instead include a route identifier that identifies or is otherwise indicative of a previously generated alternate route for avoiding the occurrence of the reference traffic event. In such embodiments, in block 612, the mobile navigation device 110 determines and/or selects an alternate route of a plurality of previously generated alternate routes capable of avoiding the occurrence of the reference traffic event. Each previously generated alternate route is associated with a different route identifier. In response to determining a particular previously generated alternate route that avoids the occurrence of the reference traffic event, the mobile navigation device 110 transmits the associated route identifier to the remote mobile navigation device 130. The remote mobile navigation device 130 may thereafter use the route identifier to retrieve the corresponding previously generated alternate route from local memory. In embodiments in which the route update data transmitted by the mobile navigation device 110 includes a route identifier, the previously generated alternate routes and the associated route identifiers may be received from the remote mobile navigation device 130 periodically or in response to a request by the mobile navigation device 110.

In some embodiments, in block 614, the mobile navigation device 110 may also generate an alternate route to avoid the segment of the current route of the vehicle 104 in which the reference traffic event is determined to have occurred. In such embodiments, the mobile navigation device 110 may generate the alternate route for the vehicle 104 based on the sensor data generated by the sensor(s) 120. As such, it should be appreciated that in addition to generating route update data to transmit to the remote mobile navigation device 130 for avoidance of the reference traffic event, the mobile navigation device 110 may also generate an alternate route for the vehicle 104 for avoidance of, or rerouting around, the reference traffic event.

Figure 7:
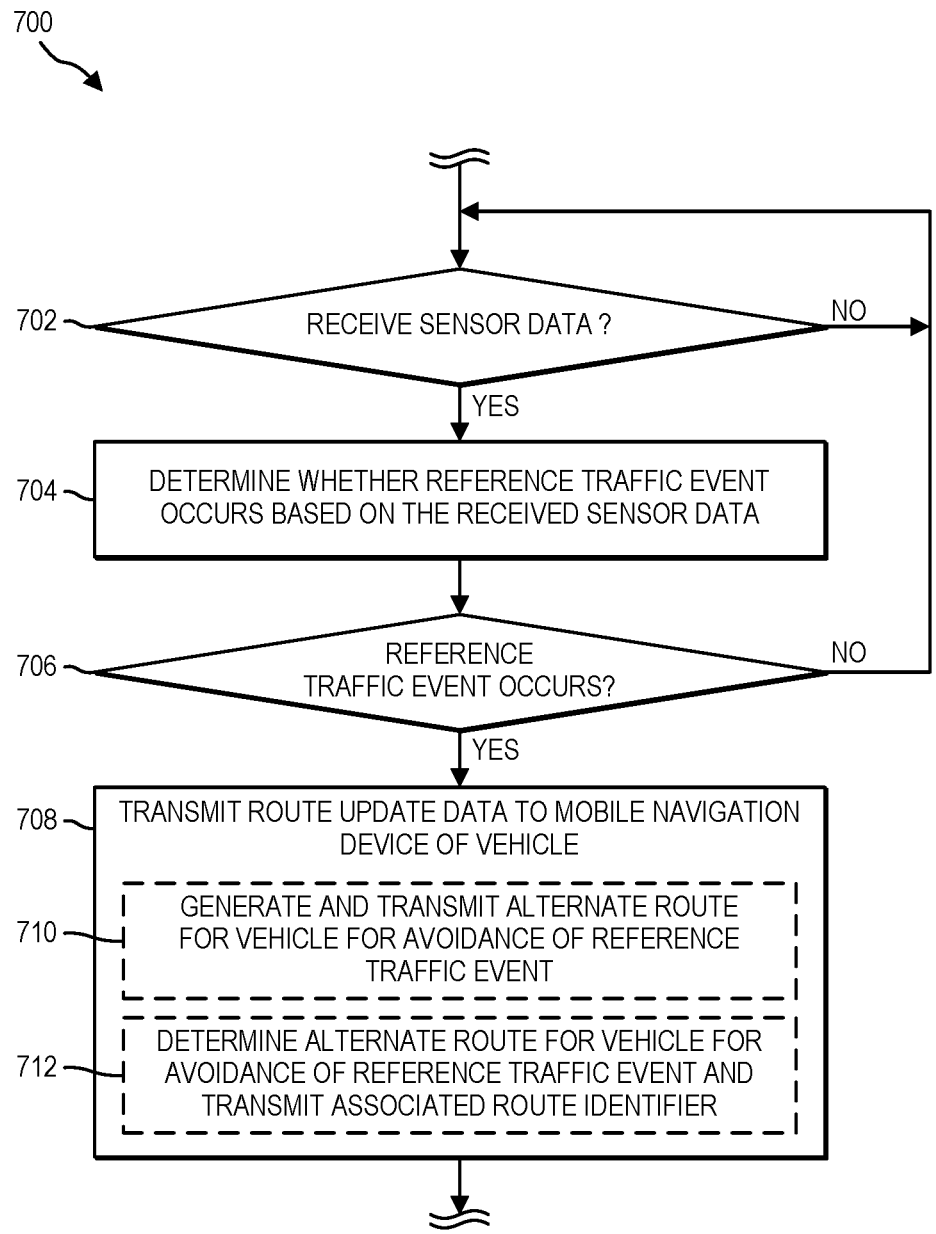
FIG. 7 is a simplified flow diagram of at least one embodiment of a method for sharing route navigation data that may be executed by the community compute device of the system of FIG. 1.

Referring now to FIG. 7, the community compute device 140 may execute a method 700 for sharing route navigation data in the community cloud 102. The method 700 begins with decision block 702 in which the community compute device 140 determines whether sensor data is received from the mobile navigation device 110 of the vehicle 104. In some embodiments, the sensor data includes location data (e.g., latitude, longitude, elevation, city, state, country, address, etc.) indicative of a current location of the vehicle 104 and/or the mobile navigation device 110. Additionally or alternatively, the sensor data includes traffic data indicative of a current traffic condition (e.g., a current traffic flow, current weather conditions, a roadway obstruction, a roadway hazard, a traffic accident, etc.) sensed, measured, and/or identified at the current location of the vehicle 104 and/or the mobile navigation device 110. If, in decision block 702, the community compute device 140 determines that the sensor data is received from the mobile navigation device 110, the method 700 advances to block 704. If, however, the community compute device 140 instead determines in decision block 702 that sensor data is not received from the mobile navigation device 110, the method 700 loops back to decision block 702 and the community compute device 140 monitors for receipt of sensor data from the mobile navigation device 110.

In block 704, the community compute device 140 determines whether a reference traffic event occurs within a segment (e.g., a portion, subset, etc.) of the current route of the vehicle 104 based on the sensor data received from the mobile navigation device 110. The reference traffic event may be embodied as any one or a combination of a reference amount of traffic congestion (e.g., a threshold volume of traffic, etc.), a reference type of traffic accident (e.g., a fender bender, an accident blocking one or more lanes of traffic, etc.), a reference amount of roadway construction (e.g., a threshold distance of roadway under construction, a threshold number of lanes reduced in a construction zone, etc.), a reference roadway obstruction (e.g., a predefined type of roadway obstruction, a threshold number of lanes reduced because of a roadway obstruction, etc.), or a reference roadway hazard (e.g., a predefined roadway condition such as icy or wet pavement, etc.). The method 700 then advances to decision block 706. If, in decision block 706, the community compute device 140 determines that a reference traffic event occurs within a segment of the current route of the vehicle 104, the method 700 advances to block 708. If, however, the community compute device 140 instead determines in decision block 706 that a reference traffic event does not occur within a segment of the current route of the vehicle 104, the method 700 loops back to decision block 702 and the community compute device 140 monitors for receipt of new sensor data from the mobile navigation device 110.

In some embodiments, the segment of the current route of the vehicle 104 in which the community compute device 140 determines that the reference traffic event has occurred corresponds to, or is otherwise similar to, one or more segments of a navigation route (e.g., an existing route, a commonly traveled route, a future route, etc.) associated with the remote vehicle 108. As such, in block 708, the community compute device 140 transmits route update data to the remote mobile navigation device 130 of the remote vehicle 108 in response to determining that a reference traffic event occurs within the segment of the current route of the vehicle 104. The route update data may be used by the remote mobile navigation device 130 to update corresponding or similar segments of navigation route (e.g., the existing route, commonly traveled route, future route, etc.) of the remote vehicle 108 to avoid the occurrence of the reference traffic event. In some embodiments, the route update data includes the sensor data received from the mobile navigation device 110. In such embodiments, the route update data may be analyzed by the remote mobile navigation device 130 to facilitate avoidance of the reference traffic event occurrence by the remote vehicle 108.

Additionally or alternatively, in some embodiments, the route update data transmitted by the community compute device 140 includes an alternate route for use by the remote mobile navigation device 130 to avoid the corresponding or similar segments of the navigation route of the remote vehicle 108 in which the reference traffic event is determined to have occurred. In such embodiments, in block 710, the community compute device 140 generates the alternate route for the remote vehicle 108 based on the received sensor data and the determined occurrence of the reference traffic event. In other embodiments, the route update data transmitted by the community compute device 140 may instead include a route identifier that identifies or is otherwise indicative of a previously generated alternate route for avoiding the occurrence of the reference traffic event. In such embodiments, in block 712, the community compute device 140 determines and/or selects an alternate route of a plurality of previously generated alternate routes capable of avoiding the occurrence of the reference traffic event. Each previously generated alternate route is associated with a different route identifier. In response to determining a particular previously generated alternate route that avoids the occurrence of the reference traffic event, the community compute device 140 transmits the associated route identifier to the remote mobile navigation device 130. The remote mobile navigation device 130 may thereafter use the route identifier to retrieve the corresponding previously generated alternate route from local memory. In embodiments in which the route update data transmitted by the community compute device 140 includes a route identifier, the previously generated alternate routes and the associated route identifiers may be received from the remote mobile navigation device 130 periodically or in response to a request by the community compute device 140.

Figure 8:
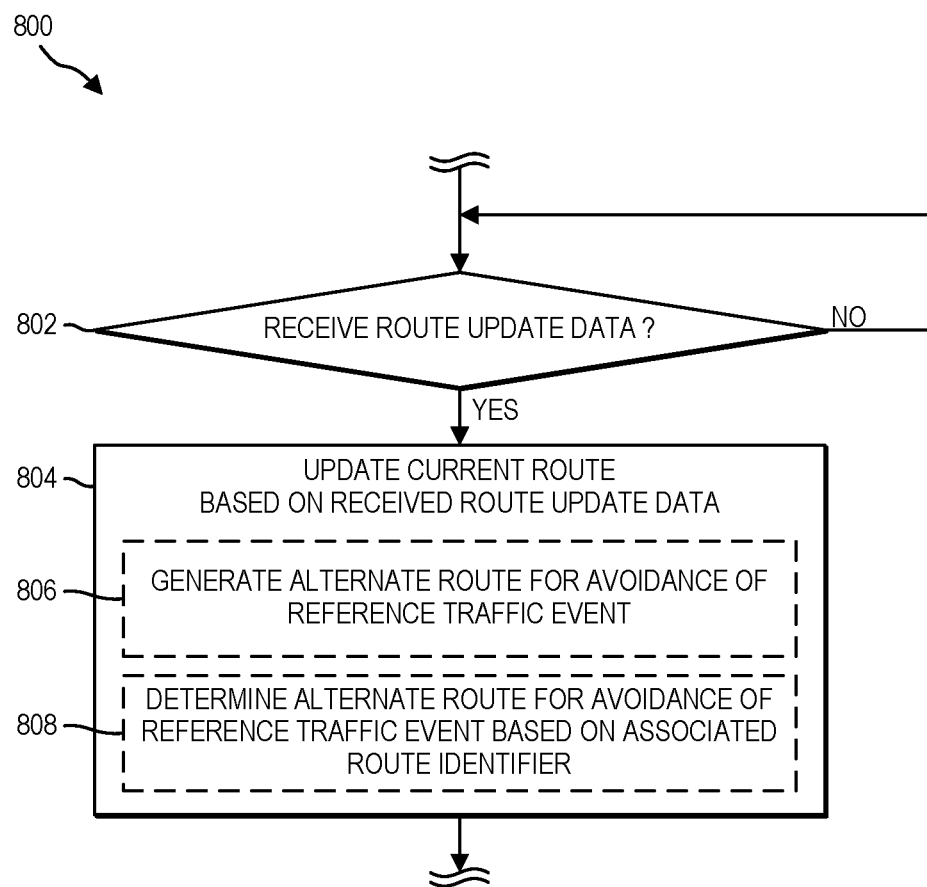
FIG. 8 is a simplified flow diagram of at least one embodiment of a method for updating a navigation route that may be executed by the mobile navigation device of the system of FIG. 1.

Referring now to FIG. 8, the mobile navigation device 110 of the vehicle 104 may execute a method 800 for updating a navigation route based on navigation data shared in the community cloud 102. The method 800 begins with decision block 802 in which the mobile navigation device 110 determines whether route update data is received from a member compute device 106 (e.g., the remote mobile navigation device(s) 130, the community compute device 140, etc.) of the community cloud 102. In some embodiments, the route update data is associated with the occurrence of a reference traffic event within at least one segment of a route of a remote vehicle 108 that corresponds to, or is otherwise similar to, one or more segments of a current route of the vehicle 104. In some embodiments, the route update data includes sensor data received from the remote mobile navigation device 130 of the remote vehicle 108. Additionally or alternatively, the route update data may be embodied as an alternate route generated by a member compute device 106 of the community cloud 102 to facilitate avoidance of the reference traffic event occurrence by the vehicle 104. In other embodiments, the route update data may be embodied as a route identifier that identifies or is otherwise indicative of a previously generated alternate route for avoiding the occurrence of the reference traffic event. If, in decision block 802, the mobile navigation device 110 determines that route update data is received from a member compute device 106 of the community cloud 102, the method 800 advances to block 804. If, however, the mobile navigation device 110 instead determines in decision block 802 that route update data is not received from a member compute device 106 of the community cloud 102, the method 800 loops back to decision block 802 and the mobile navigation device 110 monitors for receipt of route update data from a member compute device 106 of the community cloud 102.

In block 804, the mobile navigation device 110 updates the current route of the vehicle 104 to avoid the occurrence of the reference traffic event based on the received route update data. To do so, in some embodiments, the mobile navigation device 110 generates, in block 806, an alternate route to avoid the occurrence of the reference traffic event in one or more segments of the current route of the vehicle 104 based on the route update data received from the member compute device 106 (e.g., the remote mobile navigation device 130, the community compute device 140, etc.) of the community cloud 102. For example, in some embodiments, the mobile navigation device 110 may generate the alternate route based on an analysis of the sensor data received from the remote mobile navigation device 130. In other embodiments, in block 808, the mobile navigation device 110 may use the received route update data to determine an alternate route of a plurality of previously generated alternate routes capable of avoiding the occurrence of the reference traffic event. In such embodiments, the route update data received from the member compute device 106 of the community cloud 102 may include a route identifier that identifies or is otherwise indicative of a particular previously generated alternate route capable of avoiding the occurrence of the reference traffic event. As such, in response to receiving route update data that includes a route identifier, the mobile navigation device 110 may use the route identifier to retrieve the corresponding previously generated alternate route corresponding from local memory. In some embodiments, the mobile computing device 110 may transmit the plurality of previously generated alternate routes and the associated route identifiers to one or more of the member compute devices 106 of the community cloud 102 periodically or in response to a request from a member compute device 106 of the community cloud 102.

EXAMPLES

Illustrative examples of the technologies disclosed herein are provided below. An embodiment of the technologies may include any one or more, and any combination of, the examples described below.

Example 1 includes a mobile navigation device of a vehicle for sharing route navigation data, the mobile navigation device including a sensor to generate sensor data associated with a current route of the vehicle, wherein at least a segment of the current route of the vehicle corresponds to one or more segments of an existing route of a remote vehicle; a route monitoring module to determine, based on the generated sensor data, an occurrence of a reference traffic event within the segment of the current route of the vehicle; and a route determination module to transmit route update data to a remote mobile navigation device of the remote vehicle in response to a determination of the occurrence of the reference traffic event within the segment of the current route.

Example 2 includes the subject matter of Example 1, and wherein the route determination module is further to generate, in response to a determination of the occurrence of the reference traffic event within the segment of the current route, an alternate route for the remote vehicle to avoid the one or more segments of the existing route of the remote vehicle that correspond to the segment of the current route; and wherein to transmit the route update data includes to transmit the alternate route to the remote mobile navigation device of the remote vehicle.

Example 3 includes the subject matter of any of Examples 1 and 2, and wherein the route determination module is further to (i) determine, in response to a determination of the occurrence of the reference traffic event within the segment of the current route, an alternate route of a plurality of alternate routes for the remote vehicle to avoid the one or more segments of the existing route of the remote vehicle that correspond to the segment of the current route, wherein each alternate route is associated with a route identifier that identifies each alternate route within the plurality of alternate routes and (ii) determine the route identifier associated with the alternate route determined for the remote vehicle; and wherein to transmit the route update data includes to transmit, to the remote mobile navigation device of the remote vehicle, the route identifier associated with the alternate route determined for the remote vehicle.

Example 4 includes the subject matter of any of Examples 1-3, and wherein the route determination module is further to receive, from the remote mobile navigation device of the remote vehicle, one or more of the plurality of alternate routes and the route identifier associated with each of the one or more of the plurality of alternate routes received; and wherein to determine the alternate route and the associated route identifier for the remote vehicle includes to determine the alternate route and the associated route identifier for the remote vehicle from the one or more alternate routes of the plurality of alternate routes received from the remote mobile navigation device of the remote vehicle.

Example 5 includes the subject matter of any of Examples 1-4, and wherein the route determination module is further to generate, in response to a determination of the occurrence of the reference traffic event within the segment of the current route of the vehicle, an alternate route for the vehicle to avoid the segment of the current route of the vehicle.

Example 6 includes the subject matter of any of Examples 1-5, and wherein the reference traffic event includes at least one of a reference amount of traffic congestion, a reference type of traffic accident, a reference amount of roadway construction, a reference roadway obstruction, or a reference roadway hazard.

Example 7 includes the subject matter of any of Examples 1-6, and wherein to generate the sensor data associated with the current route of the vehicle includes to generate location data indicative of a current location of the vehicle.

Example 8 includes the subject matter of any of Examples 1-7, and wherein to generate the sensor data associated with the current route of the vehicle further includes to generate traffic data indicative of a current traffic condition at the current location of the vehicle.

Example 9 includes the subject matter of any of Examples 1-8, and wherein the current traffic condition includes at least one of a current traffic flow at the current location of the vehicle, current weather conditions at the current location of the vehicle, a traffic accident at the current location of the vehicle, a roadway obstruction at the current location of the vehicle, or a roadway hazard at the current location of the vehicle.

Example 10 includes the subject matter of any of Examples 1-9, and wherein to generate the traffic data indicative of the current traffic condition includes to generate traffic data indicative of a traffic accident at the current location of the vehicle based on an analysis of one or more images captured at the current location of the vehicle.

Example 11 includes the subject matter of any of Examples 1-10, and wherein the route determination module is further to (i) receive, from the remote mobile navigation device of the remote vehicle, a request for route data associated with a future route of the remote vehicle and (ii) transmit, to the remote mobile navigation device, the requested route data based on historical sensor data generated by the mobile navigation device for a past route of the vehicle.

Example 12 includes the subject matter of any of Examples 1-11, and wherein the mobile navigation device of the vehicle and the remote mobile navigation device are each member compute devices of a community cloud; and wherein to transmit the route update data to the remote mobile navigation device includes to transmit the route update data to the remote mobile navigation device of the community cloud.

Example 13 includes the subject matter of any of Examples 1-12, and further including a privacy management module to prevent transmission of the route update data to member compute devices of a public cloud, wherein the public cloud is different from the community cloud.

Example 14 includes the subject matter of any of Examples 1-13, and wherein the route determination module is further to transmit the sensor data to a community compute device of the community cloud for analysis.

Example 15 includes a method for sharing route navigation data, the method including generating, by a mobile navigation device of a vehicle, sensor data associated with a current route of the vehicle, wherein at least a segment of the current route of the vehicle corresponds to one or more segments of an existing route of a remote vehicle; determining, by the mobile navigation device and based on the generated sensor data, an occurrence of a reference traffic event within the segment of the current route of the vehicle; and transmitting, by the mobile navigation device, route update data to a remote mobile navigation device of the remote vehicle in response to a determination of the occurrence of the reference traffic event within the segment of the current route.

Example 16 includes the subject matter of Example 15, and further including generating, by the mobile navigation device and in response to a determination of the occurrence of the reference traffic event within the segment of the current route, an alternate route for the remote vehicle to avoid the one or more segments of the existing route of the remote vehicle that correspond to the segment of the current route; and wherein transmitting the route update data includes transmitting an alternate route to the remote mobile navigation device of the remote vehicle.

Example 17 includes the subject matter of any of Examples 15 and 16, and further including determining, by the mobile navigation device and in response to a determination of the occurrence of the reference traffic event within the segment of the current route, an alternate route of a plurality of alternate routes for the remote vehicle to avoid the one or more segments of the existing route of the remote vehicle that correspond to the segment of the current route, wherein each alternate route is associated with a route identifier that identifies each alternate route within the plurality of alternate routes; determining, by the mobile navigation device, the route identifier associated with the alternate route determined for the remote vehicle; and wherein transmitting the route update data includes transmitting, to the remote mobile navigation device of the remote vehicle, the route identifier associated with the alternate route determined for the remote vehicle.

Example 18 includes the subject matter of any of Examples 15-17, and further including receiving, by the mobile navigation device and from the remote mobile navigation device of the remote vehicle, one or more of the plurality of alternate routes and the route identifier associated with each of the one or more of the plurality of alternate routes received; and wherein determining the alternate route and the associated route identifier for the remote vehicle includes determining the alternate route and the associated route identifier for the remote vehicle from the one or more alternate routes of the plurality of alternate routes received from the remote mobile navigation device of the remote vehicle.

Example 19 includes the subject matter of any of Examples 15-18, and further including determining, by the mobile navigation device and in response to a determination of the occurrence of the reference traffic event within the segment of the current route of the vehicle, an alternate route for the vehicle to avoid the segment of the current route of the vehicle.

Example 20 includes the subject matter of any of Examples 15-19, and wherein the reference traffic event includes at least one of a reference amount of traffic congestion, a reference type of traffic accident, a reference amount of roadway construction, a reference roadway obstruction, or a reference roadway hazard.

Example 21 includes the subject matter of any of Examples 15-20, and wherein generating the sensor data associated with the current route of the vehicle includes generating location data indicative of a current location of the vehicle.

Example 22 includes the subject matter of any of Examples 15-21, and wherein generating the sensor data associated with the current route of the vehicle further includes generating traffic data indicative of a current traffic condition at the current location of the vehicle.

Example 23 includes the subject matter of any of Examples 15-22, and wherein the current traffic condition includes at least one of a current traffic flow at the current location of the vehicle, current weather conditions at the current location of the vehicle, a traffic accident at the current location of the vehicle, a roadway obstruction at the current location of the vehicle, or a roadway hazard at the current location of the vehicle.

Example 24 includes the subject matter of any of Examples 15-23, and wherein generating the traffic data indicative of the current traffic condition includes generating traffic data indicative of a traffic accident at the current location of the vehicle based on an analysis of one or more images captured at the current location of the vehicle.

Example 25 includes the subject matter of any of Examples 15-24, and further including receiving, by the mobile navigation device and from the remote mobile navigation device of the remote vehicle, a request for route data associated with a future route of the remote vehicle; and transmitting, by the mobile navigation device and to the remote mobile navigation device, the requested route data based on historical sensor data generated by the mobile navigation device for a past route of the vehicle.

Example 26 includes the subject matter of any of Examples 15-25, and wherein the mobile navigation device of the vehicle and the remote mobile navigation device are each member compute devices of a community cloud; and wherein transmitting the route update data to the remote mobile navigation device includes transmitting the route update data to the remote mobile navigation device of the community cloud.

Example 27 includes the subject matter of any of Examples 15-26, and further including preventing, by the mobile navigation device, transmission of the route update data to member compute devices of a public cloud, wherein the public cloud is different from the community cloud.

Example 28 includes the subject matter of any of Examples 15-27, and further including transmitting, by the mobile navigation device, the sensor data to a community compute device of the community cloud for analysis.

Example 29 includes a mobile navigation device of a vehicle for sharing route navigation data, the mobile navigation device including a processor; and a memory having stored therein a plurality of instructions that when executed by the processor cause the mobile navigation device to perform the method of any of Examples 15-28.

Example 30 includes one or more machine-readable media including a plurality of instructions stored thereon that in response to being executed result in a mobile navigation device of a vehicle performing the method of any of Examples 15-28.

Example 31 includes a mobile navigation device of a vehicle for sharing route navigation data, the mobile navigation device including means for generating sensor data associated with a current route of the vehicle, wherein at least a segment of the current route of the vehicle corresponds to one or more segments of an existing route of a remote vehicle; means for determining, based on the generated sensor data, an occurrence of a reference traffic event within the segment of the current route of the vehicle; and means for transmitting route update data to a remote mobile navigation device of the remote vehicle in response to a determination of the occurrence of the reference traffic event within the segment of the current route.

Example 32 includes the subject matter of Example 31, and further including means for generating, in response to a determination of the occurrence of the reference traffic event within the segment of the current route, an alternate route for the remote vehicle to avoid the one or more segments of the existing route of the remote vehicle that correspond to the segment of the current route; and wherein the means for transmitting the route update data includes means for transmitting the alternate route to the remote mobile navigation device of the remote vehicle.

Example 33 includes the subject matter of any of Examples 31 and 32, and further including means for determining, in response to a determination of the occurrence of the reference traffic event within the segment of the current route, an alternate route of a plurality of alternate routes for the remote vehicle to avoid the one or more segments of the existing route of the remote vehicle that correspond to the segment of the current route, wherein each alternate route is associated with a route identifier that identifies each alternate route within the plurality of alternate routes; means for determining the route identifier associated with the alternate route determined for the remote vehicle; and wherein the means for transmitting the route update data includes means for transmitting, to the remote mobile navigation device of the remote vehicle, the route identifier associated with the alternate route determined for the remote vehicle.

Example 34 includes the subject matter of any of Examples 31-33, and further including means for receiving, from the remote mobile navigation device of the remote vehicle, one or more of the plurality of alternate routes and the route identifier associated with each of the one or more of the plurality of alternate routes received; and wherein the means for determining the alternate route and the associated route identifier for the remote vehicle includes means for determining the alternate route and the associated route identifier for the remote vehicle from the one or more alternate routes of the plurality of alternate routes received from the remote mobile navigation device of the remote vehicle.

Example 35 includes the subject matter of any of Examples 31-34, and further including means for determining, in response to a determination of the occurrence of the reference traffic event within the segment of the current route of the vehicle, an alternate route for the vehicle to avoid the segment of the current route of the vehicle.

Example 36 includes the subject matter of any of Examples 31-35, and wherein the reference traffic event includes at least one of a reference amount of traffic congestion, a reference type of traffic accident, a reference amount of roadway construction, a reference roadway obstruction, or a reference roadway hazard.

Example 37 includes the subject matter of any of Examples 31-36, and wherein the means for generating the sensor data associated with the current route of the vehicle includes means for generating location data indicative of a current location of the vehicle.

Example 38 includes the subject matter of any of Examples 31-37, and wherein the means for generating the sensor data associated with the current route of the vehicle further includes means for generating traffic data indicative of a current traffic condition at the current location of the vehicle.

Example 39 includes the subject matter of any of Examples 31-38, and wherein the current traffic condition includes at least one of a current traffic flow at the current location of the vehicle, current weather conditions at the current location of the vehicle, a traffic accident at the current location of the vehicle, a roadway obstruction at the current location of the vehicle, or a roadway hazard at the current location of the vehicle.

Example 40 includes the subject matter of any of Examples 31-39, and wherein the means for generating the traffic data indicative of the current traffic condition includes means for generating traffic data indicative of a traffic accident at the current location of the vehicle based on an analysis of one or more images captured at the current location of the vehicle.

Example 41 includes the subject matter of any of Examples 31-40, and further including means for receiving, from the remote mobile navigation device of the remote vehicle, a request for route data associated with a future route of the remote vehicle; and means for transmitting, to the remote mobile navigation device, the requested route data based on historical sensor data generated by the mobile navigation device for a past route of the vehicle.

Example 42 includes the subject matter of any of Examples 31-41, and wherein the mobile navigation device of the vehicle and the remote mobile navigation device are each member compute devices of a community cloud; and wherein the means for transmitting the route update data to the remote mobile navigation device includes means for transmitting the route update data to the remote mobile navigation device of the community cloud.

Example 43 includes the subject matter of any of Examples 31-42, and further including means for preventing transmission of the route update data to member compute devices of a public cloud, wherein the public cloud is different from the community cloud.

Example 44 includes the subject matter of any of Examples 31-43, and further including means for transmitting the sensor data to a community compute device of the community cloud for analysis.

Example 45 includes a mobile navigation device of a vehicle for sharing route navigation data, the mobile navigation device including a route determination module to (i) receive route update data from a member compute device of a community cloud, the route update data determined in response to an occurrence of a reference traffic event within at least one segment of a route of a remote vehicle, wherein the at least one segment of the route of the remote vehicle corresponds to one or more segments of a current route of the vehicle and (ii) update the current route of the vehicle to avoid the reference traffic event within the one or more segments of the current route of the vehicle based on the route update data received from the member compute device of the community cloud.

Example 46 includes the subject matter of Example 45, and wherein the route update data received from the member compute device of the community cloud includes an alternate route generated to avoid the reference traffic event within the one or more segments of the current route of the vehicle; and wherein to update the current route of the vehicle includes to update the current route of the vehicle based on the alternate route.

Example 47 includes the subject matter of any of Examples 45 and 46, and wherein the route update data received from the member compute device of the community cloud includes a route identifier associated with an alternate route of a plurality of alternate routes for the vehicle to avoid the reference traffic event within the one or more segments of the current route of the vehicle, wherein each alternate route of the plurality of alternate routes for the vehicle is associated with a different route identifier; and wherein to update the current route of the vehicle includes to update the current route of the vehicle based on the alternate route associated with the route identifier received from the member compute device of the community cloud.

Example 48 includes the subject matter of any of Examples 45-47, and wherein the route determination module is further to transmit, to the member compute device of the community cloud, one or more of the plurality of alternate routes and the different route identifier associated with each of the one or more of the plurality of alternate routes transmitted.

Example 49 includes the subject matter of any of Examples 45-48, and wherein the route update data received from the member compute device of the community cloud includes sensor data generated for the at least one segment of the route of the remote vehicle within which the reference traffic event occurs; and further including a route monitoring module to determine, based on the sensor data, whether to generate an alternate route to avoid the reference traffic event within the one or more segments of the current route of the vehicle that correspond to the least one segment of the route of the remote vehicle within which the reference traffic event occurs; wherein the route determination module is further to (i) generate the alternate route in response to a determination to generate the alternate route to avoid the reference traffic event within the one or more segments of the current route of the vehicle or (ii) transmit a request for the alternate route to the member compute device of the community cloud in response to a determination not to generate the alternate route to avoid the reference traffic event within the one or more segments of the current route of the vehicle and receive the alternate route from the member compute device of the community cloud in response to the request; and wherein to update the current route of the vehicle includes to update the current route of the vehicle based on the alternate route generated by the mobile navigation device or received from the member compute device of the community cloud.

Example 50 includes the subject matter of any of Examples 45-49, and wherein to determine whether to generate the alternate route based on the sensor data includes to determine whether to generate the alternate route based on the sensor data and at least one of an amount of processing power required to generate the alternate route or an amount of remaining battery charge associated with the mobile navigation device.

Example 51 includes the subject matter of any of Examples 45-50, and wherein the reference traffic event includes at least one of a reference amount of traffic congestion, a reference type of traffic accident, a reference amount of roadway construction, a reference roadway obstruction, or a reference roadway hazard.

Example 52 includes the subject matter of any of Examples 45-51, and wherein the route determination module is further to (i) transmit, to the member compute device of the community cloud, a request for route data associated with a future route of the vehicle and (ii) receive the requested route data from the member compute device of the community cloud, wherein the requested route data generated based on historical route data associated with a past route of the remote vehicle.

Example 53 includes the subject matter of any of Examples 45-52, and wherein the member compute device includes a remote mobile navigation device of the remote vehicle.

Example 54 includes the subject matter of any of Examples 45-53, and wherein the member compute device includes a community compute device.

Example 55 includes the subject matter of any of Examples 45-54, and wherein the mobile navigation device of the vehicle and the member compute device are each member compute devices of the community cloud.

Example 56 includes the subject matter of any of Examples 45-55, and further including a privacy management module to prevent reception of the route update data from member compute devices of a public cloud, wherein the public cloud is different from the community cloud.

Example 57 includes the subject matter of any of Examples 45-56, and wherein the route determination module is to (i) transmit a request for route data associated with a future route of the vehicle to a cloud service provider of a public cloud, wherein the public cloud is different from the community cloud and (ii) receive the requested route data from the cloud service provider of the public cloud, wherein the requested route data generated based on historical route data associated with a past route of a member compute device of a remote vehicle of the public cloud.

Example 58 includes a method for sharing route navigation data, the method including receiving, by a mobile navigation device of a vehicle, route update data from a member compute device of a community cloud, the route update data determined in response to an occurrence of a reference traffic event within at least one segment of a route of a remote vehicle, wherein the at least one segment of the route of the remote vehicle corresponds to one or more segments of a current route of the vehicle; and updating, by the mobile navigation device, the current route of the vehicle to avoid the reference traffic event within the one or more segments of the current route of the vehicle based on the route update data received from the member compute device of the community cloud.

Example 59 includes the subject matter of Example 58, and wherein the route update data received from the member compute device of the community cloud includes an alternate route generated to avoid the reference traffic event within the one or more segments of the current route of the vehicle; and wherein updating the current route of the vehicle includes updating the current route of the vehicle based on the alternate route.

Example 60 includes the subject matter of any of Examples 58 and 59, and wherein the route update data received from the member compute device of the community cloud includes a route identifier associated with an alternate route of a plurality of alternate routes for the vehicle to avoid the reference traffic event within the one or more segments of the current route of the vehicle, wherein each alternate route of the plurality of alternate routes for the vehicle is associated with a different route identifier; and wherein updating the current route of the vehicle includes updating the current route of the vehicle based on the alternate route associated with the route identifier received from the member compute device of the community cloud.

Example 61 includes the subject matter of any of Examples 58-60, and further including transmitting, by the mobile navigation device and to the member compute device of the community cloud, one or more of the plurality of alternate routes and the different route identifier associated with each of the one or more of the plurality of alternate routes transmitted.

Example 62 includes the subject matter of any of Examples 58-61, and wherein the route update data received from the member compute device of the community cloud includes sensor data generated for the at least one segment of the route of the remote vehicle within which the reference traffic event occurs; and further including determining, by the mobile navigation device and based on the sensor data, whether to generate an alternate route to avoid the reference traffic event within the one or more segments of the current route of the vehicle that correspond to the least one segment of the route of the remote vehicle within which the reference traffic event occurs; generating, by the mobile navigation device, the alternate route in response to a determination to generate the alternate route to avoid the reference traffic event within the one or more segments of the current route of the vehicle; transmitting, by the mobile navigation device, a request for the alternate route to the member compute device of the community cloud in response to a determination not to generate the alternate route to avoid the reference traffic event within the one or more segments of the current route of the vehicle; receiving, by the mobile navigation device, the alternate route from the member compute device of the community cloud in response to the request; and wherein updating the current route of the vehicle includes updating the current route of the vehicle based on the alternate route generated by the mobile navigation device or received from the member compute device of the community cloud.

Example 63 includes the subject matter of any of Examples 58-62, and wherein determining whether to generate the alternate route based on the sensor data includes determining whether to generate the alternate route based on the sensor data and at least one of an amount of processing power required to generate the alternate route or an amount of remaining battery charge associated with the mobile navigation device.

Example 64 includes the subject matter of any of Examples 58-63, and wherein the reference traffic event includes at least one of a reference amount of traffic congestion, a reference type of traffic accident, a reference amount of roadway construction, a reference roadway obstruction, or a reference roadway hazard.

Example 65 includes the subject matter of any of Examples 58-64, and further including transmitting, by the mobile navigation device and to the member compute device of the community cloud, a request for route data associated with a future route of the vehicle; and receiving, by the mobile navigation device, the requested route data from the member compute device of the community cloud, wherein the requested route data generated based on historical route data associated with a past route of the remote vehicle.

Example 66 includes the subject matter of any of Examples 58-65, and wherein the member compute device includes a remote mobile navigation device of the remote vehicle.

Example 67 includes the subject matter of any of Examples 58-66, and wherein the member compute device includes a community compute device.

Example 68 includes the subject matter of any of Examples 58-67, and wherein the mobile navigation device of the vehicle and the member compute device are each member compute devices of the community cloud.

Example 69 includes the subject matter of any of Examples 58-68, and further including preventing, by the mobile navigation device, reception of the route update data from member compute devices of a public cloud, wherein the public cloud is different from the community cloud.

Example 70 includes the subject matter of any of Examples 58-69, and further including transmitting, by the mobile navigation device, a request for route data associated with a future route of the vehicle to a cloud service provider of a public cloud, wherein the public cloud is different from the community cloud; and receiving, by the mobile navigation device, the requested route data from the cloud service provider of the public cloud, wherein the requested route data generated based on historical route data associated with a past route of a member compute device of a remote vehicle of the public cloud.

Example 71 includes a mobile navigation device of a vehicle for sharing route navigation data, the mobile navigation device including a processor; and a memory having stored therein a plurality of instructions that when executed by the processor cause the mobile navigation device to perform the method of any of Examples 58-70.

Example 72 includes one or more machine-readable media including a plurality of instructions stored thereon that in response to being executed result in a mobile navigation device of a vehicle performing the method of any of Examples 58-70.

Example 73 includes a mobile navigation device of a vehicle for sharing route navigation data, the mobile navigation device including means for receiving route update data from a member compute device of a community cloud, the route update data determined in response to an occurrence of a reference traffic event within at least one segment of a route of a remote vehicle, wherein the at least one segment of the route of the remote vehicle corresponds to one or more segments of a current route of the vehicle; and means for updating the current route of the vehicle to avoid the reference traffic event within the one or more segments of the current route of the vehicle based on the route update data received from the member compute device of the community cloud.

Example 74 includes the subject matter of Example 73, and wherein the route update data received from the member compute device of the community cloud includes an alternate route generated to avoid the reference traffic event within the one or more segments of the current route of the vehicle; and wherein the means for updating the current route of the vehicle includes means for updating the current route of the vehicle based on the alternate route.

Example 75 includes the subject matter of any of Examples 73 and 74, and wherein the route update data received from the member compute device of the community cloud includes a route identifier associated with an alternate route of a plurality of alternate routes for the vehicle to avoid the reference traffic event within the one or more segments of the current route of the vehicle, wherein each alternate route of the plurality of alternate routes for the vehicle is associated with a different route identifier; and wherein the means for updating the current route of the vehicle includes means for updating the current route of the vehicle based on the alternate route associated with the route identifier received from the member compute device of the community cloud.

Example 76 includes the subject matter of any of Examples 73-75, and further including means for transmitting, to the member compute device of the community cloud, one or more of the plurality of alternate routes and the different route identifier associated with each of the one or more of the plurality of alternate routes transmitted.

Example 77 includes the subject matter of any of Examples 73-76, and wherein the route update data received from the member compute device of the community cloud includes sensor data generated for the at least one segment of the route of the remote vehicle within which the reference traffic event occurs; and further including means for determining, based on the sensor data, whether to generate an alternate route to avoid the reference traffic event within the one or more segments of the current route of the vehicle that correspond to the least one segment of the route of the remote vehicle within which the reference traffic event occurs; means for generating the alternate route in response to a determination to generate the alternate route to avoid the reference traffic event within the one or more segments of the current route of the vehicle; means for transmitting a request for the alternate route to the member compute device of the community cloud in response to a determination not to generate the alternate route to avoid the reference traffic event within the one or more segments of the current route of the vehicle; means for receiving the alternate route from the member compute device of the community cloud in response to the request; and wherein the means for updating the current route of the vehicle includes means for updating the current route of the vehicle based on the alternate route generated by the mobile navigation device or received from the member compute device of the community cloud.

Example 78 includes the subject matter of any of Examples 73-77, and wherein the means for determining whether to generate the alternate route based on the sensor data includes means for determining whether to generate the alternate route based on the sensor data and at least one of an amount of processing power required to generate the alternate route or an amount of remaining battery charge associated with the mobile navigation device.

Example 79 includes the subject matter of any of Examples 73-78, and wherein the reference traffic event includes at least one of a reference amount of traffic congestion, a reference type of traffic accident, a reference amount of roadway construction, a reference roadway obstruction, or a reference roadway hazard.

Example 80 includes the subject matter of any of Examples 73-79, and further including means for transmitting, to the member compute device of the community cloud, a request for route data associated with a future route of the vehicle; and means for receiving the requested route data from the member compute device of the community cloud, wherein the requested route data generated based on historical route data associated with a past route of the remote vehicle.

Example 81 includes the subject matter of any of Examples 73-80, and wherein the member compute device includes a remote mobile navigation device of the remote vehicle.

Example 82 includes the subject matter of any of Examples 73-81, and wherein the member compute device includes a community compute device.

Example 83 includes the subject matter of any of Examples 73-82, and wherein the mobile navigation device of the vehicle and the member compute device are each member compute devices of the community cloud.

Example 84 includes the subject matter of any of Examples 73-83, and further including means for preventing reception of the route update data from member compute devices of a public cloud, wherein the public cloud is different from the community cloud.

Example 85 includes the subject matter of any of Examples 73-84, and further including means for transmitting a request for route data associated with a future route of the vehicle to a cloud service provider of a public cloud, wherein the public cloud is different from the community cloud; and means for receiving the requested route data from the cloud service provider of the public cloud, wherein the requested route data generated based on historical route data associated with a past route of a member compute device of a remote vehicle of the public cloud.

Example 86 includes a community compute device for sharing route navigation data, the community compute device including a community route monitoring module to (i) receive sensor data from a first mobile navigation device of a first vehicle, the received sensor data is associated with a current route of the first vehicle, and wherein at least a segment of the current route of the first vehicle corresponds to one or more segments of a current route of a second vehicle and (ii) determine, based on the received sensor data, an occurrence of a reference traffic event within the segment of the current route of the first vehicle; and a community route determination module to transmit route update data to a second mobile navigation device of the second vehicle in response to the determination of the occurrence of the reference traffic event within the segment of the current route of the first vehicle.

Example 87 includes the subject matter of Example 86, and wherein the community route determination module is further to generate, in response to the determination of the occurrence of the reference traffic event within the segment of the current route of the first vehicle, an alternate route for the second vehicle to avoid the one or more segments of the current route of the second vehicle that correspond to the segment of the current route of the first vehicle; and wherein to transmit the route update data includes to transmit the alternate route to the second mobile navigation device of the second vehicle.

Example 88 includes the subject matter of any of Examples 86 and 87, and wherein the community route determination module is further to (i) determine, in response to the determination of the occurrence of the reference traffic event within the segment of the current route of the first vehicle, an alternate route of a plurality of alternate routes for the second vehicle to avoid the one or more segments of the current route of the second vehicle that correspond to the segment of the current route of the first vehicle, wherein each alternate route is associated with a route identifier that identifies each alternate route within the plurality of alternate routes and (ii) determine the route identifier associated with the alternate route determined for the second vehicle; and wherein to transmit the route update data includes to transmit, to the second mobile navigation device of the second vehicle, the route identifier associated with the alternate route determined for the second vehicle.

Example 89 includes the subject matter of any of Examples 86-88, and wherein the community route determination module is further to receive, from the second mobile navigation device of the second vehicle, one or more of the plurality of alternate routes and the route identifier associated with each of the one or more of the plurality of alternate routes received; and wherein to determine the alternate route and the associated route identifier for the second vehicle includes to determine the alternate route and the associated route identifier for the second vehicle from the one or more alternate routes of the plurality of alternate routes received from the second mobile navigation device of the second vehicle.

Example 90 includes the subject matter of any of Examples 86-89, and wherein the reference traffic event includes at least one of a reference amount of traffic congestion, a reference type of traffic accident, a reference amount of road construction, a reference roadway obstruction, or a reference roadway hazard.

Example 91 includes the subject matter of any of Examples 86-90, and wherein the sensor data received from the first mobile navigation device includes location data indicative of a current location of the first vehicle.

Example 92 includes the subject matter of any of Examples 86-91, and wherein the sensor data received from the first mobile navigation device includes location data indicative of a current location of the first vehicle and traffic data indicative of a current traffic condition at the current location of the first vehicle.

Example 93 includes the subject matter of any of Examples 86-92, and wherein the current traffic condition includes at least one of a current traffic flow at the current location of the first vehicle, current weather conditions at the current location of the first vehicle, a traffic accident at the current location of the first vehicle, a roadway obstruction at the current location of the first vehicle, or a roadway hazard at the current location of the first vehicle.

Example 94 includes the subject matter of any of Examples 86-93, and wherein the community route determination module is further to (i) receive, from the second mobile navigation device of the second vehicle, a request for route data associated with a future route of the second vehicle, (ii) generate the requested route data based on historical sensor data associated with a past route of the first vehicle, and (iii) transmit the generated route data to the second mobile navigation device.

Example 95 includes the subject matter of any of Examples 86-94, and wherein the community compute device, the first mobile navigation device, and the second mobile navigation device are each member compute devices of a community cloud; and wherein to transmit the route update data to the second mobile navigation device includes to transmit the route update data to the second mobile navigation device of the community cloud.

Example 96 includes the subject matter of any of Examples 86-95, and further including a community privacy management module to prevent transmission of the route update data to member compute devices of a public cloud, wherein the public cloud is different from the community cloud.

Example 97 includes a method for sharing route navigation data, the method including receiving, by a community compute device, sensor data from a first mobile navigation device of a first vehicle, the received sensor data is associated with a current route of the first vehicle, and wherein at least a segment of the current route of the first vehicle corresponds to one or more segments of a current route of a second vehicle; determining, by the community compute device and based on the received sensor data, an occurrence of a reference traffic event within the segment of the current route of the first vehicle; and transmitting, by the community compute device, route update data to a second mobile navigation device of the second vehicle in response to the determination of the occurrence of the reference traffic event within the segment of the current route of the first vehicle.

Example 98 includes the subject matter of Example 97, and further including generating, by the community compute device and in response to the determination of the occurrence of the reference traffic event within the segment of the current route of the first vehicle, an alternate route for the second vehicle to avoid the one or more segments of the current route of the second vehicle that correspond to the segment of the current route of the first vehicle; and wherein transmitting the route update data includes transmitting the alternate route to the second mobile navigation device of the second vehicle.

Example 99 includes the subject matter of any of Examples 97 and 98, and further including determining, by the community compute device and in response to the determination of the occurrence of the reference traffic event within the segment of the current route of the first vehicle, an alternate route of a plurality of alternate routes for the second vehicle to avoid the one or more segments of the current route of the second vehicle that correspond to the segment of the current route of the first vehicle, wherein each alternate route is associated with a route identifier that identifies each alternate route within the plurality of alternate routes; determining, by the community compute device, the route identifier associated with the alternate route determined for the second vehicle; and wherein transmitting the route update data includes transmitting, to the second mobile navigation device of the second vehicle, the route identifier associated with the alternate route determined for the second vehicle.

Example 100 includes the subject matter of any of Examples 97-99, and further including receiving, by the community compute device and from the second mobile navigation device of the second vehicle, one or more of the plurality of alternate routes and the route identifier associated with each of the one or more of the plurality of alternate routes received; and wherein determining the alternate route and the associated route identifier for the second vehicle includes determining the alternate route and the associated route identifier for the second vehicle from the one or more alternate routes of the plurality of alternate routes received from the second mobile navigation device of the second vehicle.

Example 101 includes the subject matter of any of Examples 97-100, and wherein the reference traffic event includes at least one of a reference amount of traffic congestion, a reference type of traffic accident, a reference amount of roadway construction, a reference roadway obstruction, or a reference roadway hazard.

Example 102 includes the subject matter of any of Examples 97-101, and wherein the sensor data received from the first mobile navigation device includes location data indicative of a current location of the first vehicle.

Example 103 includes the subject matter of any of Examples 97-102, and wherein the sensor data received from the first mobile navigation device includes location data indicative of a current location of the first vehicle and traffic data indicative of a current traffic condition at the current location of the first vehicle.

Example 104 includes the subject matter of any of Examples 97-103, and wherein the current traffic condition includes at least one of a current traffic flow at the current location of the first vehicle, current weather conditions at the current location of the first vehicle, a traffic accident at the current location of the first vehicle, a roadway obstruction at the current location of the first vehicle, or a roadway hazard at the current location of the first vehicle.

Example 105 includes the subject matter of any of Examples 97-104, and further including receiving, by the community compute device and from the second mobile navigation device of the second vehicle, a request for route data associated with a future route of the second vehicle; generating, by the community compute device, the requested route data based on historical sensor data associated with a past route of the first vehicle; and transmitting, by the community compute device, the generated route data to the second mobile navigation device.

Example 106 includes the subject matter of any of Examples 97-105, and wherein the community compute device, the first mobile navigation device, and the second mobile navigation device are each member compute devices of a community cloud; and wherein transmitting the route update data to the second mobile navigation device includes transmitting the route update data to the second mobile navigation device of the community cloud.

Example 107 includes the subject matter of any of Examples 97-106, and further including preventing, by the community compute device, transmission of the route update data to member compute devices of a public cloud, wherein the public cloud is different from the community cloud.

Example 108 includes a community compute device for sharing route navigation data, the community compute device including a processor; and a memory having stored therein a plurality of instructions that when executed by the processor cause the community compute device to perform the method of any of Examples 97-107.

Example 109 includes one or more machine-readable media including a plurality of instructions stored thereon that in response to being executed result in a community compute device performing the method of any of Examples 97-107.

Example 110 includes a community compute device for sharing route navigation data, the community compute device including means for receiving sensor data from a first mobile navigation device of a first vehicle, the received sensor data is associated with a current route of the first vehicle, and wherein at least a segment of the current route of the first vehicle corresponds to one or more segments of a current route of a second vehicle; means for determining, based on the received sensor data, an occurrence of a reference traffic event within the segment of the current route of the first vehicle; and means for transmitting route update data to a second mobile navigation device of the second vehicle in response to the determination of the occurrence of the reference traffic event within the segment of the current route of the first vehicle.

Example 111 includes the subject matter of Example 110, and further including means for generating, in response to the determination of the occurrence of the reference traffic event within the segment of the current route of the first vehicle, an alternate route for the second vehicle to avoid the one or more segments of the current route of the second vehicle that correspond to the segment of the current route of the first vehicle; and wherein the means for transmitting the route update data includes means for transmitting the alternate route to the second mobile navigation device of the second vehicle.

Example 112 includes the subject matter of any of Examples 110 and 111, and further including means for determining, in response to the determination of the occurrence of the reference traffic event within the segment of the current route of the first vehicle, an alternate route of a plurality of alternate routes for the second vehicle to avoid the one or more segments of the current route of the second vehicle that correspond to the segment of the current route of the first vehicle, wherein each alternate route is associated with a route identifier that identifies each alternate route within the plurality of alternate routes; means for determining the route identifier associated with the alternate route determined for the second vehicle; and wherein the means for transmitting the route update data includes means for transmitting, to the second mobile navigation device of the second vehicle, the route identifier associated with the alternate route determined for the second vehicle.

Example 113 includes the subject matter of any of Examples 110-112, and further including means for receiving, from the second mobile navigation device of the second vehicle, one or more of the plurality of alternate routes and the route identifier associated with each of the one or more of the plurality of alternate routes received; and wherein the means for determining the alternate route and the associated route identifier for the second vehicle includes means for determining the alternate route and the associated route identifier for the second vehicle from the one or more alternate routes of the plurality of alternate routes received from the second mobile navigation device of the second vehicle.

Example 114 includes the subject matter of any of Examples 110-113, and wherein the reference traffic event includes at least one of a reference amount of traffic congestion, a reference type of traffic accident, a reference amount of roadway construction, a reference roadway obstruction, or a reference roadway hazard.

Example 115 includes the subject matter of any of Examples 110-114, and wherein the sensor data received from the first mobile navigation device includes location data indicative of a current location of the first vehicle.

Example 116 includes the subject matter of any of Examples 110-115, and wherein the sensor data received from the first mobile navigation device includes location data indicative of a current location of the first vehicle and traffic data indicative of a current traffic condition at the current location of the first vehicle.

Example 117 includes the subject matter of any of Examples 110-116, and wherein the current traffic condition includes at least one of a current traffic flow at the current location of the first vehicle, current weather conditions at the current location of the first vehicle, a traffic accident at the current location of the first vehicle, a roadway obstruction at the current location of the first vehicle, or a roadway hazard at the current location of the first vehicle.

Example 118 includes the subject matter of any of Examples 110-117, and further including means for receiving, from the second mobile navigation device of the second vehicle, a request for route data associated with a future route of the second vehicle; means for generating the requested route data based on historical sensor data associated with a past route of the first vehicle; and means for transmitting the generated route data to the second mobile navigation device.

Example 119 includes the subject matter of any of Examples 110-118, and wherein the community compute device, the first mobile navigation device, and the second mobile navigation device are each member compute devices of a community cloud; and wherein the means for transmitting the route update data to the second mobile navigation device includes means for transmitting the route update data to the second mobile navigation device of the community cloud.

Example 120 includes the subject matter of any of Examples 110-119, and further including means for preventing transmission of the route update data to member compute devices of a public cloud, wherein the public cloud is different from the community cloud.

The invention claimed is:

1. A compute device for sharing route data via a cloud network, the compute device comprising:
processor circuitry to:
access, via the cloud network, data corresponding to sensor data from a first mobile compute device of a first vehicle;
determine, based on the data corresponding to the sensor data, an occurrence of a traffic event; and
identify a plurality of vehicles having a mobile compute device associated with the compute device that are impacted by the traffic event; and
communication circuitry to transmit, via the cloud network, route update data indicative of the traffic event to one or more of the mobile compute devices of the identified plurality of vehicles in response to the determination of the occurrence of the traffic event, the route update data to enable the identified plurality of vehicles to avoid the traffic event.

2. The compute device of claim 1, wherein the traffic event is a traffic accident at a current location of the first vehicle.

3. The compute device of claim 1, wherein the traffic event is roadway construction at a current location of the first vehicle.

4. The compute device of claim 1, wherein the traffic event is a current weather condition at a current location of the first vehicle.

5. The compute device of claim 1, wherein the communication circuitry is to use a cellular network to transmit the route update data indicative of the traffic event to one or more of the mobile compute devices of the plurality of vehicles.

6. The compute device of claim 1, wherein the communication circuitry is to transmit the route update data indicative of the traffic event to one or more of the mobile compute devices of the plurality of vehicles by transmitting the route update data indicative of the traffic event only to mobile compute devices that are associated with a vehicle of the identified plurality of vehicles.

7. The compute device of claim 1, wherein the communication circuitry is to transmit the route update data indicative of the traffic event to one or more of the mobile compute devices of the plurality of vehicles by transmitting the route update data indicative of the traffic event in real time.

8. The compute device of claim 1, wherein the sensor data includes one or more images captured at a current location of the first vehicle, and the processor circuitry is to determine the occurrence of a traffic event by identifying a traffic accident at the current location of the first vehicle based on an analysis of the one or more images.

9. One or more computer-readable storage devices comprising a plurality of instructions that, when executed, causes processor circuitry of a compute device to:
access, via a cloud network, data corresponding to an output of a sensor associated with a first mobile compute device of a first vehicle;
determine, based on the data, an occurrence of a traffic event;
identify a plurality of vehicles that are impacted by the traffic event, respective ones of the plurality of vehicles having a mobile compute device associated with the compute device; and
cause transmission of route update data indicative of the traffic event to one or more of the mobile compute devices of the identified plurality of vehicles via the cloud network in response to the determination of the occurrence of the traffic event to assist the identified plurality of vehicles to avoid the traffic event.

10. The one or more computer-readable storage devices of claim 9, wherein the traffic event is a traffic accident at a current location of the first vehicle.

11. The one or more computer-readable media of claim 9, wherein the traffic event is roadway construction at a current location of the first vehicle.

12. The one or more computer-readable media of claim 9, wherein the traffic event is a current weather condition at a current location of the first vehicle.

13. The one or more computer-readable storage devices of claim 9, wherein the plurality of instructions, when executed, cause the processor circuitry of the compute device to cause the transmission of the route update data indicative of the traffic event to one or more of the mobile compute devices of the plurality of vehicles via a cellular network.

14. The one or more computer-readable storage devices of claim 9, wherein the instructions cause the processor circuitry to cause transmission of the route update data only to mobile compute devices that are associated with a vehicle of the identified plurality of vehicles.

15. The one or more computer-readable storage devices of claim 9, wherein the instructions cause the processor circuitry to cause transmission of the route update data in real time.

16. The one or more computer-readable storage devices of claim 9, wherein the data corresponding to the output of the sensor includes one or more images captured at a current location of the first vehicle, wherein the instructions cause the processor circuitry to determine, based on the data corresponding to the sensor output, the occurrence of a traffic event by identifying a traffic accident at the current location of the first vehicle based on an analysis of the one or more images.

* * * * *